(12) United States Patent
Park et al.

(10) Patent No.: US 12,406,989 B2
(45) Date of Patent: *Sep. 2, 2025

(54) COMPOSITE CATHODE ACTIVE MATERIAL, CATHODE AND LITHIUM BATTERY INCLUDING THE SAME, AND METHOD OF PREPARING THE COMPOSITE CATHODE ACTIVE MATERIAL

(71) Applicants: Samsung Electronics Co., Ltd., Suwon-si (KR); Samsung SDI Co., Ltd., Yongin-si (KR)

(72) Inventors: Kwangjin Park, Seongnam-si (KR); Dongsu Ko, Seoul (KR); Kyoungmin Min, Suwon-si (KR); Changhoon Jung, Seoul (KR); Byungjin Choi, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,350

(22) Filed: Sep. 26, 2023

(65) Prior Publication Data

US 2024/0030434 A1    Jan. 25, 2024

Related U.S. Application Data

(63) Continuation of application No. 15/860,901, filed on Jan. 3, 2018, now Pat. No. 11,799,078.

(30) Foreign Application Priority Data

Jun. 30, 2017   (KR) .................. 10-2017-0083607

(51) Int. Cl.
*H01M 10/0525*    (2010.01)
*H01M 4/04*    (2006.01)
(Continued)

(52) U.S. Cl.
CPC ......... *H01M 4/525* (2013.01); *H01M 4/0471* (2013.01); *H01M 4/1391* (2013.01);
(Continued)

(58) Field of Classification Search
CPC .............. C01P 2002/32; C01P 2002/72; C01P 2004/04; H01M 2004/028; H01M 4/525;
(Continued)

(56) References Cited

U.S. PATENT DOCUMENTS 6,984,469 B2   1/2006   Kweon et al.
9,391,317 B2   7/2016   Ofer et al.
(Continued)

FOREIGN PATENT DOCUMENTS

CN   1282113 A   1/2001
CN   101423255 A   5/2009
(Continued)

OTHER PUBLICATIONS

Yang et al., "Intergrown LiNi0.5Mn1.504 LiNi1/3Co1/3Mn1/3O2 composite nanorods as high-energy density cathode materials form lithium-ion batteries*", Journal of Materials Chemistry A, 1, 2013, pp. 13742-13745.
(Continued)

*Primary Examiner* — Uyen M Tran
(74) *Attorney, Agent, or Firm* — CANTOR COLBURN LLP

(57) ABSTRACT

A composite cathode active material and a cathode and a lithium battery including the composite cathode active material. The composite cathode active material has a core including a plurality of primary particles including a nickel-containing first lithium transition metal oxide having a layered crystal structure; a grain boundary disposed between adjacent primary particles of the plurality of primary particles; and a shell on the core, the shell including a second (Continued)

lithium transition metal oxide having a spinel crystal structure, wherein the grain boundary includes a first composition having a spinel crystal structure.

23 Claims, 14 Drawing Sheets

(51) Int. Cl.
| | |
|---|---|
| *H01M 4/1391* | (2010.01) |
| *H01M 4/36* | (2006.01) |
| *H01M 4/485* | (2010.01) |
| *H01M 4/505* | (2010.01) |
| *H01M 4/525* | (2010.01) |
| *H01M 10/052* | (2010.01) |
| *H01M 4/02* | (2006.01) |

(52) U.S. Cl.
CPC .......... *H01M 4/366* (2013.01); *H01M 4/485* (2013.01); *H01M 4/505* (2013.01); *H01M 10/052* (2013.01); *C01P 2002/32* (2013.01); *C01P 2002/72* (2013.01); *C01P 2004/04* (2013.01); *H01M 2004/028* (2013.01); *H01M 10/0525* (2013.01)

(58) Field of Classification Search
CPC .. H01M 4/0471; H01M 4/1391; H01M 4/366; H01M 4/485; H01M 4/505; H01M 10/052; H01M 10/0525
See application file for complete search history.

(56) References Cited

U.S. PATENT DOCUMENTS

| | | | |
|---|---|---|---|
| 9,705,125 | B2 | 7/2017 | Kelder et al. |
| 9,899,674 | B2 | 2/2018 | Hirai et al. |
| 9,979,014 | B2 | 5/2018 | Kim et al. |
| 2002/0076613 | A1 | 6/2002 | Lee et al. |
| 2002/0114995 | A1 | 8/2002 | Thackeray et al. |
| 2003/0180615 | A1 | 9/2003 | Johnson et al. |
| 2008/0131782 | A1 | 6/2008 | Hagiwara et al. |
| 2009/0017384 | A1 | 1/2009 | Iwasaki et al. |
| 2011/0171530 | A1 | 7/2011 | Esaki et al. |
| 2012/0034527 | A1 | 2/2012 | Yao et al. |
| 2012/0282521 | A1 | 11/2012 | Choi et al. |
| 2013/0175469 | A1 | 7/2013 | Paulsen et al. |
| 2013/0274473 | A1 | 10/2013 | Che et al. |
| 2014/0027670 | A1 | 1/2014 | Sun et al. |
| 2014/0045067 | A1* | 2/2014 | Cho ............... C01G 45/1235 429/231.95 |
| 2014/0087254 | A1 | 3/2014 | Li et al. |
| 2014/0197357 | A1* | 7/2014 | Ofer ............... C01G 51/50 252/182.1 |
| 2014/0377655 | A1* | 12/2014 | Mun ............... H01M 4/505 427/126.3 |
| 2015/0104708 | A1 | 4/2015 | Bi |
| 2015/0171423 | A1 | 6/2015 | Kim et al. |
| 2015/0357638 | A1 | 12/2015 | Sun et al. |
| 2015/0380736 | A1 | 12/2015 | Park et al. |
| 2016/0013475 | A1 | 1/2016 | Ofer et al. |
| 2016/0181610 | A1 | 6/2016 | Shim et al. |
| 2016/0181611 | A1 | 6/2016 | Cho et al. |
| 2016/0240849 | A1* | 8/2016 | Kuriyama ......... H01M 50/209 |
| 2016/0260965 | A1 | 9/2016 | Wu et al. |
| 2016/0336594 | A1 | 11/2016 | Ahn et al. |
| 2017/0077514 | A1 | 3/2017 | Cho et al. |
| 2017/0250404 | A1 | 8/2017 | Cho |
| 2017/0309888 | A1 | 10/2017 | Yu et al. |
| 2017/0317342 | A1 | 11/2017 | Kang et al. |
| 2017/0358779 | A1 | 12/2017 | Wu et al. |
| 2017/0358797 | A1 | 12/2017 | Son et al. |
| 2017/0358799 | A1 | 12/2017 | Gunji et al. |
| 2018/0026268 | A1 | 1/2018 | Kim et al. |
| 2018/0233740 | A1 | 8/2018 | You et al. |
| 2018/0254511 | A1 | 9/2018 | Park et al. |
| 2019/0006669 | A1 | 1/2019 | Park et al. |
| 2019/0190063 | A1 | 6/2019 | Gogyo et al. |
| 2021/0043925 | A1 | 2/2021 | Kim et al. |

FOREIGN PATENT DOCUMENTS

| | | | |
|---|---|---|---|
| CN | 102376949 A | | 3/2012 |
| CN | 103187554 A | | 7/2013 |
| CN | 103996838 A | * | 8/2014 |
| CN | 105428640 A | | 3/2016 |
| CN | 106953070 A | | 7/2017 |
| CN | 106966438 A | | 7/2017 |
| EP | 3316357 A1 | | 5/2018 |
| JP | 1999016566 A | | 1/1999 |
| JP | 2007287569 A | | 11/2007 |
| JP | 2009038021 A | | 2/2009 |
| JP | 2011171150 A | | 9/2011 |
| JP | 5223166 B2 | | 6/2013 |
| JP | 2013206679 A | | 10/2013 |
| JP | 2014220232 A | | 11/2014 |
| JP | 2015122235 A | | 7/2015 |
| JP | 2017010842 A | | 1/2017 |
| KR | 100560534 B1 | | 3/2006 |
| KR | 100752703 B1 | | 8/2007 |
| KR | 1020120121235 A | | 11/2012 |
| KR | 1020120124779 A | | 11/2012 |
| KR | 1020140047657 A | | 4/2014 |
| KR | 101458676 A | | 6/2014 |
| KR | 1020140099218 A | | 8/2014 |
| KR | 20150070853 A | | 6/2015 |
| KR | 1020150070853 A | | 6/2015 |
| KR | 101590441 B1 | | 2/2016 |
| KR | 101630209 B1 | | 6/2016 |
| KR | 1020160074236 A | | 6/2016 |
| KR | 1020160083638 A | | 7/2016 |
| KR | 1020160134317 A | | 11/2016 |
| KR | 101726530 B1 | | 4/2017 |
| KR | 1020170045833 A | | 4/2017 |
| KR | 1020170063397 A | | 6/2017 |
| KR | 1020180010122 A | | 1/2018 |
| WO | 2016053056 A1 | | 4/2016 |

OTHER PUBLICATIONS

Jarvis, Karalee A. "The Role of Composition in the Atomic Structure, Oxygen Loss, and Capacity of Layered Li—Mn—Ni oxide Cathodes", Journal of Material Chemistry A. vol. 2, Nov. 2013, pp. 1353-1362 year 2013.

Maitra et al., "Importance of trivalency and the eg1 configuration in the photocatalytic oxidation of water by Mn and Co oxides", PNAS, vol. 110, No. 29, 2013, pp. 11704-11707.

Wang et al., "Strongly phosphorescent platinum(II) complexes supported by tetradentate benzazole-containing ligands*", Journal of Materials Chemistry C, 3, 2015, pp. 8212-8218.

Yang-Kook Sun et al., High voltage performance of concentration-gradient Li[Ni0.67Co0/15Mn0.18]O2 cathode material for lithium-ion batteries, Electrochimica Acta 55, 2010, 8621-8627.

* cited by examiner 500 nm 600 nm 600 nm 200 nm 200 nm 200 nm 500 nm 600 nm 600 nm 600 nm 600 nm 600 nm

COMPOSITE CATHODE ACTIVE MATERIAL, CATHODE AND LITHIUM BATTERY INCLUDING THE SAME, AND METHOD OF PREPARING THE COMPOSITE CATHODE ACTIVE MATERIAL

CROSS-REFERENCE TO RELATED APPLICATION

This application is a continuation of U.S. patent application Ser. No. 15/860,901, filed on Jan. 3, 2018, and claims priority to and the benefit of Korean Patent Application No. 10-2017-0083607, filed on Jun. 30, 2017, in the Korean Intellectual Property Office, and all the benefits accruing therefrom under 35 U.S.C. § 119, the contents of which are incorporated herein by reference in their entirety.

BACKGROUND

1. Field

The present disclosure relates to a composite cathode active material, a cathode, and a lithium battery including the composite cathode active material, and a method of preparing the composite cathode active material.

2. Description of the Related Art

In order to achieve miniaturization and high performance of various devices, in addition to miniaturization and weight reduction of a lithium battery, high energy density is becoming important. That is, a high capacity of a lithium battery is becoming important.

A cathode active material having a high capacity has been examined to manufacture a lithium battery having the characteristics described above.

A nickel-based cathode active material may lead to poor lifespan characteristics and poor thermal stability due to a high amount of residual surface lithium and a side reaction caused by cation mixing.

Therefore, there is a need for a method that can prevent deterioration of battery performance while including a nickel-based cathode active material.

SUMMARY

Provided is a composite cathode active material capable of preventing deterioration of battery performance by suppressing a side reaction on a surface of and inside the composite cathode active material.

Provided is a cathode including the composite cathode active material.

Provided is a lithium battery including the cathode.

Provided is a method of preparing the composite cathode active material.

Additional aspects will be set forth in part in the description which follows and, in part, will be apparent from the description, or may be learned by practice of the presented embodiments.

According to an aspect of an embodiment, a composite cathode active material includes: a core including a plurality of primary particles including a nickel-containing first lithium transition metal oxide having a layered crystal structure; and a grain boundary disposed between adjacent primary particles among the plurality of primary particles; and a shell on the core, the shell including a second lithium transition metal oxide having a spinel crystal structure, wherein the grain boundary includes a first composition having a spinel crystal structure.

According to an aspect of an embodiment, a cathode includes the composite cathode active material.

According to an aspect of an embodiment, a lithium battery includes the cathode.

According to an aspect of an embodiment, a method of preparing a composite cathode active material includes: providing a solution including a precursor of a second lithium transition metal oxide having a spinel crystal structure; mixing the solution and a nickel-containing first lithium transition metal oxide having a layered crystal structure to prepare a mixture; drying the mixture to prepare a dried product; and heat-treating the dried product to prepare the composite cathode active material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
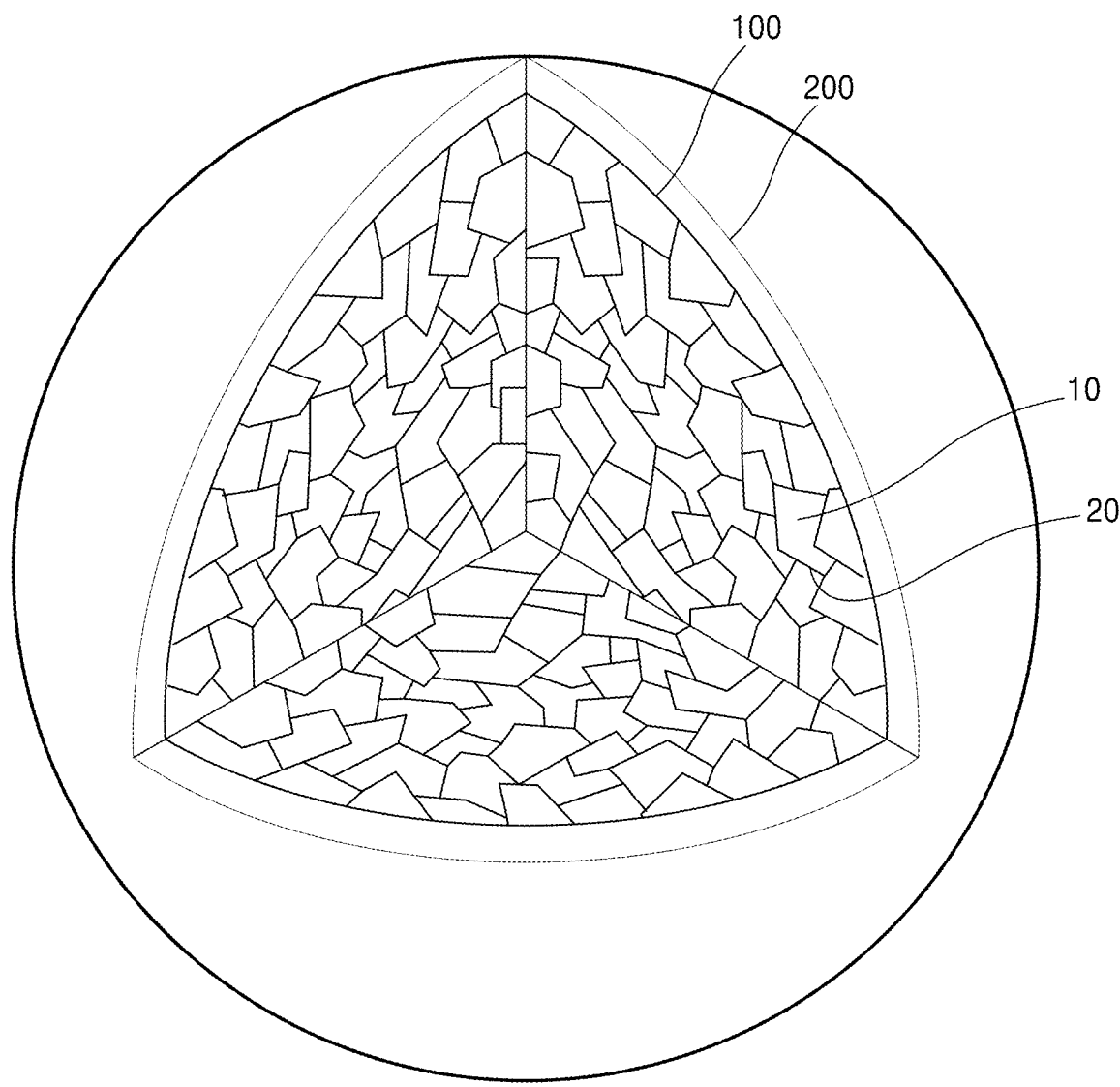
FIG. 1A is a schematic view that partially illustrates an internal structure of an embodiment of a composite cathode active material.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. Expressions such as "at least one of," when preceding a list of elements, modify the entire list of elements and do not modify the individual elements of the list.

As the present inventive concept allows for various changes and numerous embodiments, particular embodiments will be illustrated in the drawings and described in detail in the written description. However, this is not intended to limit the present inventive concept to particular modes of practice, and it is to be appreciated that all changes, equivalents, and substitutes that do not depart from the spirit and technical scope are encompassed in the present inventive concept. As used herein, the term "and/or" includes any and all combinations of one or more of the associated listed items.

The terms used in the present specification are merely used to describe particular embodiments, and are not intended to limit the inventive concept. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Thicknesses of several layers and regions in the drawings may be exaggerated for convenience of explanation. Throughout the specification, like reference numerals in the drawings denote like elements. Throughout the specification, it will be understood that when a component, such as a layer, a film, a region, or a plate, is referred to as being "on" another component, the component can be directly on the other component or intervening components may be present thereon. Throughout the specification, while such terms as "first," "second," etc., may be used to describe various components, such components must not be limited to the above terms. The above terms are used only to distinguish one component from another.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A C rate means a current which will discharge a battery in one hour, e.g., a C rate for a battery having a discharge capacity of 1.6 ampere-hours would be 1.6 amperes.

Hereinafter, a composite cathode active material, a method of preparing the same, and a cathode and a lithium battery including the composite cathode active material, according to example embodiments, will be described in detail.

According to an embodiment, a composite cathode active material includes a core including a plurality of primary particles including a nickel-containing first lithium transition metal oxide having a layered crystal structure; and a grain boundary disposed between the plurality of primary particles adjacent to each other; and a shell that is disposed on the core, wherein the shell includes a second lithium transition metal oxide having a spinel crystal structure, and wherein the grain boundary includes a first composition having a spinel crystal structure.

Figure 1B:
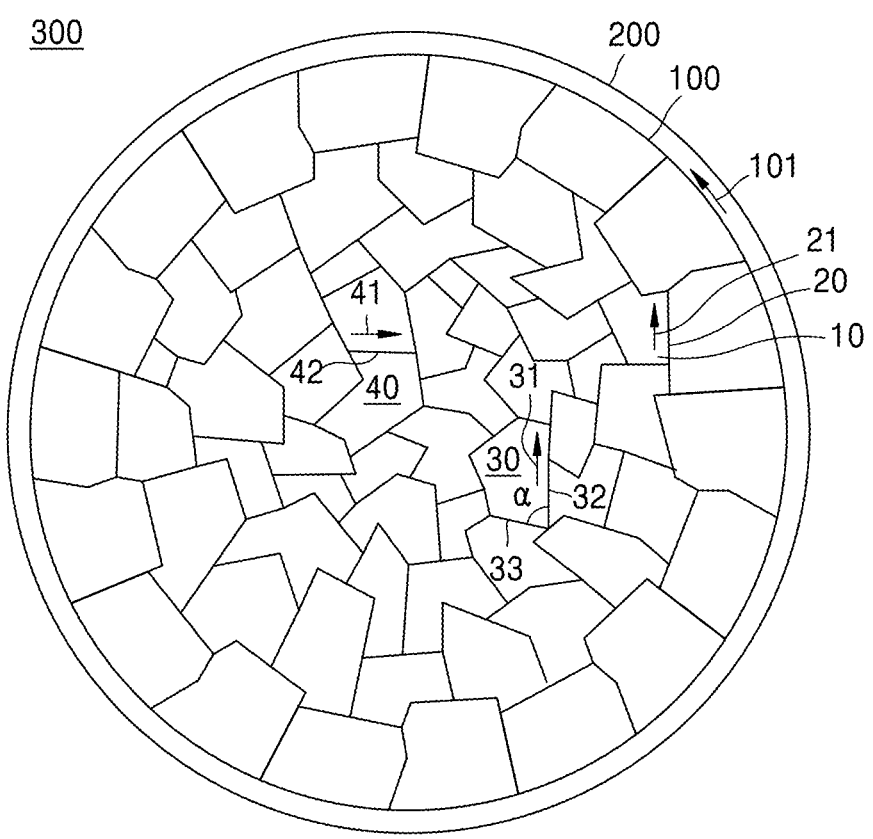
FIG. 1B is a schematic cross-sectional view of an embodiment of a composite cathode active material.

Referring to FIGS. 1A and 1B, a composite cathode active material 300 includes a core 100 including a plurality of primary particles 10 and a grain boundary 20 disposed between adjacent primary particles of the plurality of primary particles 10; and a shell 200 that is disposed on the core 100. For example, the plurality of primary particles 10 may be crystallites that have the same crystal structure within the primary particles 10. Each of the plurality of primary particles 10 includes a nickel-containing first lithium transition metal oxide having a layered crystal structure, and the shell 200 includes a second lithium transition metal oxide having a spinel crystal structure. For example, the shell 200 may be a coating layer that is disposed on a part of or the whole surface of the core 100. The grain boundary 20 between the adjacent primary particles of the plurality of primary particles 10 includes a first composition having a spinel crystal structure. The composite cathode active material 300 may be a secondary particle formed by agglomeration of the plurality of primary particles 10.

While not wanting to be bound by theory, it is understood that when the core 100 of the composite cathode active material 300 includes the grain boundary 20 including the first composition having a spinel crystal structure between the adjacent primary particles of the plurality of primary particles 10, lithium ion conduction within the core 100 may be facilitated, and elution of nickel ions from the primary particle 10 in the core 100 to an electrolyte solution penetrated into the core 100 may be suppressed. Also, a side reaction of the primary particle 10 and the electrolyte solution within the core 100 may be suppressed, and thus, cycle characteristics of a lithium battery including the composite cathode active material 300 may improve. Also, an amount of lithium residue on surfaces of the plurality of primary particles 10 may decrease, and thus deterioration of the composite cathode active material 300 may be suppressed. Further, gas occurrence may decrease, which may result improvement of thermal stability of the lithium battery. Since the first composition having a spinel crystal structure included in the grain boundary 20 between adjacent primary particles 10 may withstand a volume change of the primary particles 10 during a charge/discharge process, cracks between the primary particles 10 may be suppressed. In this regard, mechanical strength deterioration of the composite cathode active material 300 may be suppressed even after repeating a charge/discharge process, and thus degradation of the lithium battery may be prevented.

When the shell 200 having a spinel crystal structure is further added on a surface of the core 100, a side reaction of the core 100 and an electrolyte solution may be effectively prevented. Also, unlike the core 100 having a layered crystal structure, since the shell 200 having a spinel crystal structure provides 3-dimensional lithium ion transport pathways, an inner resistance of a lithium battery including the composite cathode active material 300 decreases, and thus cycle characteristics of the lithium battery may further improve. Also, due to the shell 200, an amount of lithium residue on a surface of the composite cathode active material 300 further decreases, and thus degradation of the lithium battery may be suppressed, which may result in a decrease of gas occurrence.

In the composite cathode active material 300, an amount of nickel among transition metals included in the first lithium transition metal oxide may be about 70 mole percent (mol %) or more, about 71 mol % or more, about 75 mol % or more, about 80 mol % or more, about 85 mol % or more, about 90 mol % or more, about 93 mol % or more, about 95 mol % or more, or about 97 mol % or more, e.g., about 71 mol % to about 99 mol %, about 75 mol % to about 98 mol %, or about 80 mol % to about 95 mol %, based on a total content of transition metals included in the first lithium transition metal oxide. When an amount of nickel in the first lithium transition metal oxide is about 70 mol % or more, a capacity may increase. Therefore, a lithium battery having a high capacity may be manufactured.

A concentration of at least one transition metal other than nickel in the grain boundary of the composite cathode active material may be greater than a concentration of at least one transition metal other than nickel in the primary particle. For example, a transition metal in the grain boundary at a concentration greater than that in the primary particle may comprise Mn, Co, Fe, or a combination thereof. In particular, a transition metal in the grain boundary at a concentration greater than that in the primary particle may be Mn and/or Co.

In the core of the composite cathode active material, the grain boundary disposed between the adjacent primary particles of 50% or more of the primary particles among the total primary particles may include the first composition. The primary particles that contact the grain boundary including the first composition may be, for example, about 50% or more, about 55% or more, about 60% or more, about 65% or more, about 70% or more, about 75% or more, about 80% or more, about 85% or more, about 90% or more, about 95% or more, about 96% or more, about 97% or more, about 98% or more, or about 99% or more of the total primary particles, e.g., about 50% to about 99%, about 55% to about 98%, or about 60% to about 95% of the total primary particles. That is, the grain boundary between the adjacent primary particles of most of the primary particles included in the core may include the first composition having a spinel crystal structure.

In the core of the composite cathode active material, the first composition may be disposed at a homogeneous concentration throughout an inside of the core. In some embodiments, the first composition may have a concentration gradient that changes from a center part to a surface part of the core. For example, a concentration of the first composition may be low at a center part of the core, and a concentration of the first composition may be high at a surface part of the core. For example, a concentration of the first composition may be high at a center part of the core, and a concentration of the first composition may be low at a surface part of the core. The first composition may be arranged in the core in the discontinuous manner.

Referring to FIG. 1B, in the core 100 of the composite cathode active material 300, the grain boundary 20 may substantially be in the form of a straight line or rectilinear in cross-section. When the primary particles 10 adjacent to the grain boundary 20 have a layered crystal structure, the primary particles 10 may have a polyhedral shape, and thus the grain boundary 20 adjacent to the primary particles 10 may have a straight line or may be rectilinear in cross-section.

Referring to FIG. 1B, in the composite cathode active material 300, the grain boundary 20 may be arranged in a direction 21 parallel to a surface of the adjacent primary particle 10, and the direction 21 in which the grain boundary 20 is arranged may be different from a direction of a tangent 101 of a nearest outer surface of the core 100.

Referring to FIG. 1B, in the composite cathode active material 300, the core 100 may include a first grain boundary 32 and a second grain boundary 33, wherein the first grain boundary 32 and the second grain boundary 33 may be disposed directly on the same primary particle 30 among the plurality of primary particles 10, and the first grain boundary 32 and the second grain boundary 33 may cross each other at an angle (a) that is determined by a shape of the primary particle 30. The angle (a) at which the first grain boundary 32 and the second grain boundary 33 cross each other may be in a range of greater than about 0 degree to less than about 180 degrees, or, for example, about 10 degrees to about 170 degrees, about 20 degrees to about 160 degrees, about degrees to about 150 degrees, about 40 degrees to about 140 degrees, about 50 degrees to about 130 degrees, about 60 degrees to about 120 degrees, about 70 degrees to about 110 degrees, or about 80 degrees to about 110 degrees.

Referring to FIG. 1B, in the composite cathode active material 300, the core 100 may include a plurality of grain boundaries 32 and 42 that are adjacent to the plurality of primary particles 30 and 40, each respectively, wherein the plurality of grain boundaries 32 and 42 are arranged in directions 31 and 41 that are parallel to surfaces of the primary particles 30 and 40 adjacent to the plurality of grain boundaries 32 and 42, each respectively, and the directions 31 and 41, in which the plurality of grain boundaries 32 and 42 are arranged, each respectively, may be different from each other.

Referring to FIG. 1B, in the composite cathode active material 300, the grain boundaries 20, 32, and 42 may have an average grain boundary length in a range of about 50 nanometers (nm) to about 1000 nm and an average grain boundary thickness in a range of about 1 nm to about 200 nm. Directions of the lengths of the grain boundaries 21, 31, and 41 may be parallel to surfaces of the adjacent primary particles 30, and 40, and directions of the thicknesses of the grain boundaries 21, 31, and 41 may be perpendicular to surfaces of the adjacent primary particles 10, 30, and 40. For example, the average grain boundary length may be in a range of about 50 nm to about 950 nm, about 100 nm to about 900 nm, about 150 nm to about 800 nm, or about 200 nm to about 700 nm. For example, the average grain boundary thickness may be in a range of about 2 nm to about 100 nm, about 5 nm to about 100 nm, about 10 nm to about 100 nm, or about 20 nm to about 100 nm. When the average grain boundary length and the average grain boundary thickness are within these ranges, a lithium battery may have improved charge/discharge characteristics.

In the composite cathode active material 300, an average particle diameter of the primary particles 10 may be in a range of about 50 nm to about 500 nm, about 50 nm to about 450 nm, about 50 nm to about 400 nm, about 50 nm to about 350 nm, about 50 nm to about 300 nm, about 50 nm to about 250 nm, or about 50 nm to about 200 nm, but embodiments are not limited thereto, and the average particle diameter of the primary particles 10 may vary further, as long as it provides improved charge/discharge characteristics to a lithium battery.

In the composite cathode active material 300, an average particle diameter of the core 100, which is formed of the agglomerated primary particles, may be in a range of about 1 micrometers (μm) to about 30 μm, about 2 μm to about 28 μm, about 4 μm to about 26 μm, about 6 μm to about 24 μm, about 8 μm to about 22 μm, about 10 μm to about 20 μm, about 12 μm to about 18 μm, about 12 μm to about 16 μm, or about 13 μm to about 15 μm, but embodiments are not limited thereto, and the average particle diameter of the core 100 may vary further, as long as it may provide suitable charge/discharge characteristics to a lithium battery.

In the composite cathode active material 300, the first composition may include about 0.1 mole (mol) to about 1.3 mol of lithium, based on 1 mol of the first composition, about 1.7 mol to about 2.3 mol of a transition metal, based on 1 mol of the first composition, and about 3.7 mol to about 4.3 mol of oxygen, based on 1 mol of the first composition. For example, the first composition may include about 0.9 mol to about 1.2 mol of lithium, based on 1 mol of the first composition, about 1.8 mol to about 2.2 mol of a transition metal, based on 1 mol of the first composition, and about 3.8 mol to about 4.2 mol of oxygen, based on 1 mol of the first composition. For example, the first composition may include about 1.0 mol to about 1.1 mol of lithium, based on 1 mol of the first composition, about 1.9 mol to about 2.1 mol of a transition metal, based on 1 mol of the first composition, and about 3.9 mol to about 4.1 mol of oxygen, based on 1 mol of the first composition.

In the composite cathode active material 300, the first composition may have the same composition with that of the second lithium transition metal oxide. For example, the first composition may include at least one transition metal at the same concentration the second lithium transition metal oxide includes the at least one transition metal. For example, the first composition may be prepared by using the same precursor that is used to prepare the second lithium transition metal oxide.

In the composite cathode active material 300, the spinel crystal structure of the first composition may have cubic symmetry, e.g., belong to an Fd$\bar{3}$m space group. In the composite cathode active material, the spinel crystal structure of the second lithium transition metal oxide may belong to an Fd$\bar{3}$m space group. When the spinel crystal structure of the first composition and/or the second lithium transition metal oxide belongs to an Fd$\bar{3}$m space group, cycle characteristics and thermal stability of a lithium battery including the composite cathode active material may improve.

In the composite cathode active material 300, the grain boundary 20 may further include a lithium transition metal oxide, a lithium-free transition metal oxide, or a mixture thereof, which is a second composition. The second composition may include an amorphous structure, a layered crystal structure, a spinel crystal structure, a polyvalent anion crystal structure, or a combination thereof. That is, the grain boundary 20 may further include the second composition having a composition different from that of the first composition or another crystal structure within the scope that does not deteriorate charge/discharge characteristics of a lithium battery.

In the composite cathode active material 300, the first lithium transition metal oxide may include about 0.1 mol to about 1.3 mol of lithium, based on 1 mol of the first lithium transition metal oxide, about 0.7 mol to about 0.99 mol of nickel, based on 1 mol of the first lithium transition metal oxide, about 0.01 mol to about 0.3 mol of a transition metal other than nickel, based on 1 mol of the first lithium transition metal oxide, and about 1.7 mol to about 2.3 mol of oxygen, based on 1 mol of the first lithium transition metal oxide.

For example, the first lithium transition metal oxide may be represented by Formula 1:

$$Li_aMO_2.$$ Formula 1

In Formula 1, M includes nickel and at least one non-nickel Group 4 to Group 13 element; an amount of nickel in M is in a range of about 70 mol % to less than about 100 mol %, based on a total content of M; and $0.9 \leq a \leq 1.1$.

For example, the first lithium transition metal oxide may be represented by Formula 2:

$$Li_aNi_bM1_cM2_dM3_eO_2.$$ Formula 2

In Formula 2, M1, M2, and M3 are different and each independently includes manganese (Mn), vanadium (V), chromium (Cr), iron (Fe), cobalt (Co), zirconium (Zr), rhenium (Re), aluminum (Al), boron (B), germanium (Ge), ruthenium (Ru), tin (Sn), titanium (Ti), niobium (Nb), molybdenum (Mo), or platinum (Pt); and $0.9 \leq a \leq 1.1$, $0.7 < b < 1.0$, $0 < c < 0.3$, $0 < d < 0.3$, $0 \leq e < 0.1$, and $b+c+d+e=1$.

For example, in an embodiment of Formula 2 in which M1 and M2 of Formula 2 are Co and Mn, respectively, the first lithium transition metal oxide may be represented by Formula 3:

$$Li_aNi_bCo_cMn_dM3'_eO_2.$$ Formula 3

In Formula 3, M3' includes vanadium (V), chromium (Cr), iron (Fe), zirconium (Zr), rhenium (Re), aluminum (Al), boron (B), germanium (Ge), ruthenium (Ru), tin (Sn), titanium (Ti), niobium (Nb), molybdenum (Mo), or platinum (Pt); and $0.9 \leq a \leq 1.1$, $0.7 < b < 1.0$, $0 < c < 0.3$, $0 < d < 0.3$, $0 \leq e < 0.1$, and $b+c+d+e=1$.

In the composite cathode active material, the first lithium transition metal oxide may include first layer-structured crystals that belong to a C2/m space group, second layer-structure crystals that belong to an R$\bar{3}$m space group, or a combination thereof. The first lithium transition metal oxide may be a composite of the first layer-structured crystals and the second layer-structure crystals.

For example, the first lithium transition metal oxide may include second layer-structure crystals that have a composition represented by Formula 4a and belonging to a C2/m space group; and third layer-structure crystals that have a composition represented by Formula 4b and belonging to an R$\bar{3}$m space group:

$$Li_2MnO_3, and$$ Formula 4a $$LiM'''O_2.$$ Formula 4b

In Formula 4b, M''' includes nickel and manganese (Mn), vanadium (V), chromium (Cr), iron (Fe), cobalt (Co), zirconium (Zr), rhenium (Re), aluminum (Al), boron (B), germanium (Ge), ruthenium (Ru), tin (Sn), titanium (Ti), niobium (Nb), molybdenum (Mo), platinum (Pt), or a combination thereof. At least a part of M is Ni. An amount of Ni in M may be about 70 mol % or more, based on a total content of M.

For example, the first lithium transition metal oxide may be represented by Formula 4c:

$$aLi_2MnO_3 \cdot (1-a)LiM''O_2.\qquad\text{Formula 4c}$$

In Formula 4c, M" includes nickel (Ni) and cobalt (Co), manganese (Mn), vanadium (V), chromium (Cr), iron (Fe), zirconium (Zr), rhenium (Re), aluminum (Al), boron (B), germanium (Ge), ruthenium (Ru), tin (Sn), titanium (Ti), niobium (Nb), molybdenum (Mo), platinum (Pt), or a combination thereof. At least a part of M is Ni. An amount of Ni in M may be about 70 mol % or more, based on a total content of M; and 0<a<1.

In the composite cathode active material, the second lithium transition metal oxide may be represented by Formula 5:

$$Li_bM'_2O_4.\qquad\text{Formula 5}$$

In Formula 5, M includes manganese and selected non-manganese Group 4 to Group 13 element; and $1.0 \leq b \leq 1.1$.

For example, the second lithium transition metal oxide may be represented by Formula 6:

$$Li_aMn_bM4_cM5_dO_4.\qquad\text{Formula 6}$$

In Formula 6, M4 and M5 are different and each independently includes cobalt (Co), nickel (Ni), vanadium (V), chromium (Cr), iron (Fe), zirconium (Zr), rhenium (Re), aluminum (Al), boron (B), germanium (Ge), ruthenium (Ru), tin (Sn), titanium (Ti), niobium (Nb), molybdenum (Mo), or platinum (Pt); and $0.9 \leq a \leq 1.1$, $0<b \leq 2.0$, $0 \leq c<2.0$, $0 \leq d<0.1$, and $b+c+d=2$.

For example, the second lithium transition metal oxide may be represented by Formula 7:

$$Li_aMn_bCo_cM5'_dO_4.\qquad\text{Formula 7}$$

In Formula 7, M5' includes vanadium (V), chromium (Cr), iron (Fe), zirconium (Zr), rhenium (Re), aluminum (Al), boron (B), germanium (Ge), ruthenium (Ru), tin (Sn), titanium (Ti), niobium (Nb), molybdenum (Mo), or platinum (Pt); and $0.9 \leq a \leq 1.1$, $0<b<2.0$, $0<c<2.0$, $0 \leq d<0.1$, and $b+c+d=2$.

In the composite cathode active material 300, a thickness of the shell 200 may be about 300 nm or less, about 250 nm or less, about 200 nm or less, about 150 nm or less, about 100 nm or less, about 90 nm or less, about 80 nm or less, about 70 nm or less, about 60 nm or less, about 50 nm or less, about 40 nm or less, about 30 nm or less, about 20 nm or less, or about 10 nm or less. When the thickness of the shell is within these ranges, cycle characteristics and thermal stability of a lithium battery including the composite cathode active material may improve.

In the composite cathode active material 300, the sum of amounts of the second lithium transition metal oxide and the first composition may be about 10 weight percent (wt %) or less, about 9 wt % or less, about 8 wt % or less, about 7 wt % or less, about 6 wt % or less, about 5 wt % or less, about 4 wt % or less, about 3.5 wt % or less, about 3 wt % or less, about 2.5 wt % or less, about 2 wt % or less, or about 1 wt % or less, based on the total weight of the composite cathode active material, e.g., about 10 wt % to about 0.001 wt %, about 9 wt % to about 0.01 wt %, or about 8 wt % to about 0.1 wt %, or about 7 wt % to about 0.5 wt %, based on the total weight of the composite cathode active material. The sum of amounts of the second lithium transition metal oxide and the first composition may be about 0.01 wt % or more, about 0.05 wt % or more, about 0.1 wt % or more, about 0.2 wt % or more, about 0.3 wt % or more, about 0.4 wt % or more, or about 0.5 wt % or more. When the sum of amounts of the second lithium transition metal oxide and the first composition is within these ranges, cycle characteristics and thermal stability of a lithium battery including the composite cathode active material may improve.

A crack growth of a cross-section of the composite cathode active material after cycles of charging and discharging of a lithium battery including the composite cathode active material is defined by Equation 1, and the crack growth may be about 6% or less, about 5% or less, about 4% or less, about 3% or less, or about 2% or less, e.g., about 6% to about 0.01%, about 5% to about 0.1%, about 4% to about 0.5%, or about 3% to about 1%. When the composite cathode active material has a low crack growth of about 6% or less, deterioration of the composite cathode active material may be prevented even after repeating the charging and discharging for a long period of time.

Crack growth (%)=[(pore area of cross-section of composite cathode active material particles after 50 charge/discharge cycles—pore area of cross-section of composite cathode active material particles before charge/discharge cycles)/pore area of cross-section of composite cathode active material particles before charge/discharge cycles]×100%   Equation 1

Figure 8A:
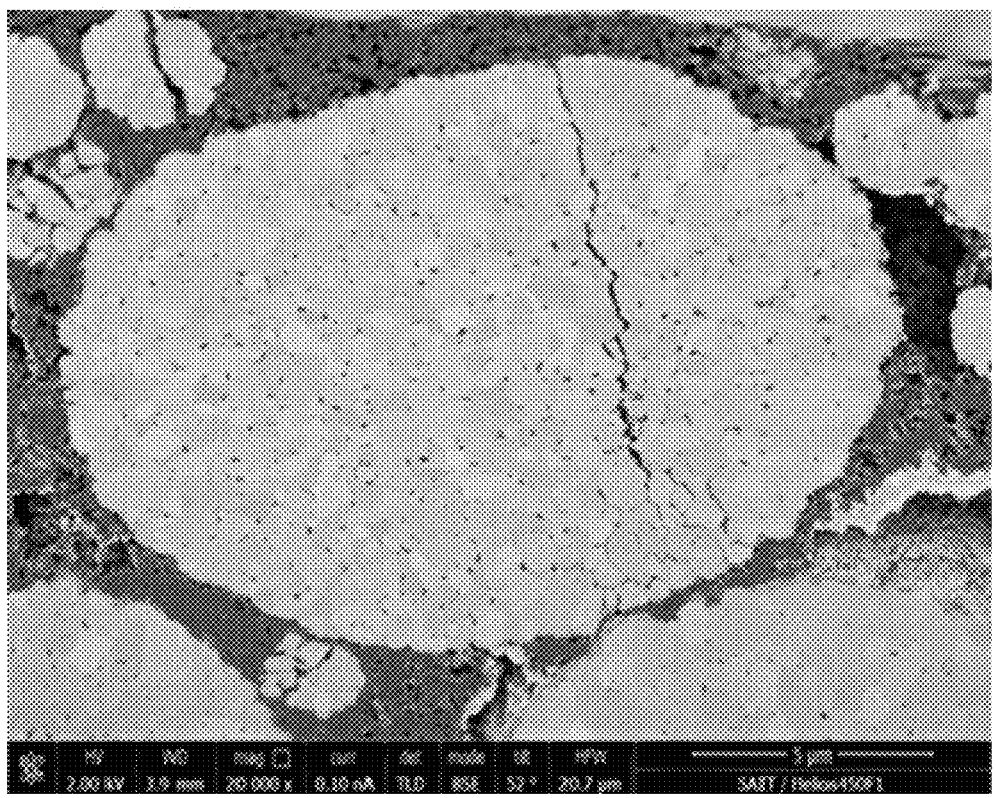
FIGS. 8A and 8B are scanning electron microscope images of the cross-section of the composite cathode active material prepared in Example 3 before and after 50 charge/discharge cycles.
Figure 8B:
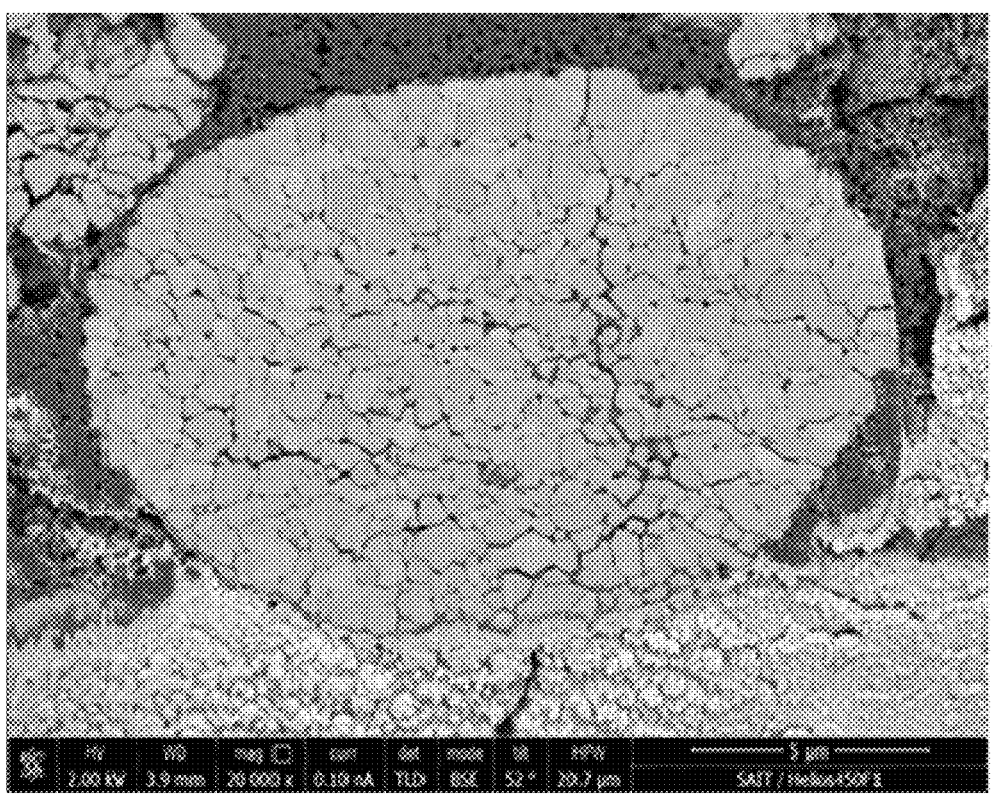

In Equation 1, the term "pore area" denotes an area of pores, for example, shown in black in the composite cathode active material in FIG. 8A.

According to an embodiment, a cathode may include the composite cathode active material.

A cathode is prepared as follows. For example, the composite cathode active material, a conducting agent, a binder, and a solvent are mixed to prepare a cathode active material composition. In some embodiments, the cathode active material composition may be directly coated and dried on an aluminum current collector to prepare a cathode plate. In some embodiments, the cathode active material composition may be cast on a separate support to form a cathode active material film, which may then be separated from the support and laminated on an aluminum current collector to prepare a cathode plate having a cathode active material layer formed thereon.

The conducting agent may be carbon black, graphite particulates, natural graphite, artificial graphite, acetylene black, and Ketjen black; carbon fibers; carbon nanotubes; metal powder or metal fibers or metal tubes of copper, nickel, aluminum, or silver; or a conducting polymer such as a polyphenylene derivative, but embodiments are not limited thereto. Any suitable material available as a conducting agent in the art may be used.

Examples of the binder are a vinylidene fluoride/hexafluoropropylene copolymer, polyvinylidene fluoride ("PVDF"), polyacrylonitrile, polymethyl methacrylate, polytetrafluoroethylene ("PTFE"), mixtures thereof, and a styrene butadiene rubber polymer, but embodiments are not limited thereto. Any suitable material available as a binding agent in the art may be used. Examples of the solvent are N-methyl-pyrrolidone ("NMP"), acetone, or water, but embodiments are not limited thereto. Any suitable material available as a solvent in the art may be used.

In some embodiments, pores may be formed in the cathode by further including a plasticizing agent in the cathode active material composition.

Amounts of the composite cathode active material, the conducting agent, the binder, and the solvent may be in ranges that are used in lithium batteries. At least one of the conducting agent, the binder, and the solvent may be omitted according to the use and the structure of the lithium battery.

In some embodiments, the cathode may further include a second cathode active material in addition to the composite cathode active material.

The second cathode active material is a lithium-containing metal oxide, which may be any suitable material available in the art. For example, the second cathode active material may a lithium composite oxide including cobalt, manganese, nickel, or a combination thereof. Examples of the second cathode active material may be $Li_aA_{1-b}B'_bD'_2$ (where $0.90 \le a \le 1.0$ and $0 \le b \le 0.5$); $Li_aE_{1-b}B'_bO_{2-c}D'_c$ (where $0.90 \le a \le 1.0$, $0 \le b \le 0.5$ and $0 \le c \le 0.05$); $LiE_{2-b}B'_bO_{4-c}D'_c$ (where $0 \le b \le 0.5$ and $0 \le c \le 0.05$); $Li_aNi_{1-b-c}Co_bB'_cD'_\alpha$ (where $0.90 \le a \le 1.0$, $0 \le b \le 0.5$, $0 \le c \le 0.05$, and $0 < \alpha \le 2$); $Li_aNi_{1-b-c}Co_bB'_cO_{2-\alpha}F'_\alpha$ (where $0.90 \le a \le 1.0$, $0 \le b \le 0.5$, $0 \le c \le 0.05$, and $0 < a < 2$); $Li_aNi_{1-b-c}Co_bB'_cO_{2-\alpha}F'_2$ (where $0.90 \le a \le 1.0$, $0 \le b \le 0.5$, $0 \le c \le 0.05$, and $0 < a < 2$); $Li_aNi_{1-b-c}Mn_bB'_cD'_\alpha$ (where $0.90 \le a \le 1.0$, $0 \le b \le 0.5$, $0 \le c \le 0.05$, and $0 < \alpha \le 2$); $Li_aNi_{1-b-c}Mn_bB'_cO_{2-\alpha}F'_\alpha$ (where $0.90 \le a \le 1.0$, $0 \le b \le 0.5$, $0 \le c \le 0.05$, and $0 < a < 2$); $Li_aNi_{1-b-c}Mn_bB'_cO_{2-\alpha}F'_2$ (where $0.90 \le a \le 1.0$, $0 \le b \le 0.5$, $0 \le c \le 0.05$, and $0 < \alpha < 2$); $Li_aN-i_bE_cG_dO_2$ (where $0.90 \le a \le 1.0$, $0 \le b \le 0.9$, $0 \le c \le 0.5$, and $0.001 \le d \le 0.1.$); $Li_aNi_bCo_cMn_dG_eO_2$ (where $0.90 \le a \le 1.0$, $0 \le b \le 0.9$, $0 \le c \le 0.5$, $0 \le d \le 0.5$, and $0.001 \le e \le 0.1.$); $Li_aNiG_bO_2$ (where $0.90 \le a \le 1.0$ and $0.001 \le b \le 0.1.$); $Li_aCoG_bO_2$ (where $0.90 \le a \le 1.0$ and $0.001 \le b \le 0.1.$); $Li_aMnG_bO_2$ (where $0.90 \le a \le 1.8$ and $0.001 \le b \le 0.1.$); $Li_aMn_2G_bO_4$ (where $0.90 \le a \le 1.0$ and $0.001 \le b \le 0.1.$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \le f \le 2$); $Li_{(3-f)}Fe_2(PO_4)_3$ (where $0 \le f \le 2$); and $LiFePO_4$.

In the formulae above, A may include nickel (Ni), cobalt (Co), manganese (Mn), or a combination thereof; B' may include aluminum (Al), nickel (Ni), cobalt (Co), manganese (Mn), chromium (Cr), iron (Fe), magnesium (Mg), strontium (Sr), vanadium (V), a rare earth element, or a combination thereof; D' may include oxygen (O), fluorine (F), sulfur (S), phosphorus (P), or a combination thereof; E may include cobalt (Co), manganese (Mn), or a combination thereof; F' may include fluorine (F), sulfur (S), phosphorus (P), or a combination thereof; G may include aluminum (Al), chromium (Cr), manganese (Mn), iron (Fe), magnesium (Mg), lanthanum (La), cerium (Ce), strontium (Sr), vanadium (V), or a combination thereof; Q may include titanium (Ti), molybdenum (Mo), manganese (Mn), or a combination thereof; I' may include chromium (Cr), vanadium (V), iron (Fe), scandium (Sc), yttrium (Y), or a combination thereof; and J may include vanadium (V), chromium (Cr), manganese (Mn), cobalt (Co), nickel (Ni), copper (Cu), or a combination thereof.

The compounds listed above as cathode active materials may have a surface coating layer (hereinafter, also referred to as "coating layer"). Alternatively, a mixture of the compound being those listed above and a compound without a coating layer may be used. In some embodiments, the coating layer may include an oxide, a hydroxide, an oxyhydroxide, an oxycarbonate, a hydroxycarbonate, or a combination thereof. In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. The coating layer may be formed using any suitable method (for example, a spray coating method or a dipping method) that does not adversely affect the physical properties of the cathode active material when a compound of the coating element is used. Any suitable coating method may be well understood by one of ordinary skill in the art, and thus a detailed description thereof will be omitted.

According to an embodiment, a lithium battery includes a cathode including the composite cathode active material. The lithium battery may be manufactured as follows.

First, a cathode is prepared according to a method of preparing the cathode described above.

Next, an anode is prepared as follows. The anode may be prepared in the same manner as the cathode, except that an anode active material is used instead of the composite cathode active material. Also, the same conducting agent, binder, and solvent used in the preparation of the cathode may be used in the preparation of an anode active material composition.

For example, an anode active material, a conducting agent, a binder, and a solvent are mixed together to prepare an anode active material composition. In some embodiments, the anode active material composition may be directly coated on a copper current collector to prepare an anode plate. In some embodiments, the anode active material composition may be cast on a separate support to form an anode active material film, which may then be separated from the support and laminated on a copper collector to prepare an anode plate.

The anode active material may be any suitable material that is generally used in the art. Examples of the anode active material may include lithium, a metal that is alloyable with lithium, a transition metal oxide, a non-transition metal oxide, and a carbonaceous material.

For example, the metal alloyable with lithium may be Si, Sn, Al, Ge, Pb, Bi, Sb, an Si—Y' alloy (where, Y' is an alkali metal, an alkaline earth metal, a Group 13 element, a Group 14 element, a transition metal, a rare earth element, or a combined element thereof, and is not Si); or a Sn—Y' alloy (where, Y' is an alkali metal, an alkaline earth metal, a Group 13 element, a Group 14 element, a transition metal, a rare earth element, or a combined element thereof, and is not Sn). Examples of the element Y' may include Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

Examples of the transition metal oxide may include a lithium titanium oxide, a vanadium oxide, and a lithium vanadium oxide.

Examples of the non-transition metal oxide may include $SnO_2$ and $SiO_x$ (where $0 < x < 2$).

The carbonaceous material may be crystalline carbon, amorphous carbon, or a mixture thereof. Examples of the crystalline carbon may include natural graphite and artificial graphite, each of which has an amorphous shape, a plate shape, a flake shape, a spherical shape, or a fiber shape. Examples of the amorphous carbon may include soft carbon (low-temperature calcined carbon), hard carbon, mesophase pitch carbide, and calcined cokes.

Amounts of the anode active material, the conducting agent, the binder, and the solvent may be may be in ranges that are used in lithium batteries.

Then, the cathode and the anode may be separated by a separator, and the separator may be any of various suitable separators that are typically used in a lithium battery. In particular, the separator may include a material that has a low resistance to migration of ions of an electrolyte and an excellent electrolytic solution-retaining ability. For example, the separator may glass fibers, polyester, Teflon, polyethylene, polypropylene, polytetrafluoroethylene ("PTFE"), or a combination thereof, each of which may be non-woven or woven fabric. For example, a rollable separator including polyethylene or polypropylene may be used for a lithium ion battery. A separator with a good organic electrolytic solution-retaining ability may be used for a lithium ion polymer battery. For example, the separator may be manufactured in the following manner.

A polymer resin, a filler, and a solvent may be mixed together to prepare a separator composition. Then, the separator composition may be directly coated on an electrode, and then dried to form the separator. In some embodiments, the separator composition may be cast on a support and then dried to form a separator film, which may then be separated from the support and laminated on an electrode to form the separator.

The polymer resin used to manufacture the separator may be any suitable material that is used as a binder for an electrode plate. Examples of the polymer resin are a vinylidenefluoride/hexafluoropropylene copolymer, polyvinylidene fluoride (PVDF), polyacrylonitrile, polymethylmethacrylate and a mixture thereof.

Next, an electrolyte is prepared.

In some embodiments, the electrolyte may be an organic electrolyte solution. In some embodiments, the electrolyte may be in a solid phase. Examples of the electrolyte are boron oxide and lithium oxynitride. Any suitable material available as a solid electrolyte in the art may be used. In some embodiments, the solid electrolyte may be formed on the anode by, for example, sputtering.

In some embodiments, the organic electrolyte solution may be prepared by dissolving a lithium salt in an organic solvent.

The organic solvent may be any suitable solvent available as an organic solvent in the art. In some embodiments, the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxirane, 4-methyldioxirane, N,N-dimethyl formamide, dimethyl acetamide, dimethylsulfoxide, dioxane, 1,2-dimethoxyethane, sulfolane, dichloroethane, chlorobenzene, nitrobenzene, diethylene glycol, dimethyl ether, or a mixture thereof.

In some embodiments, the lithium salt may be any suitable material available as a lithium salt in the art. In some embodiments, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each independently a natural number), LiCl, LiI, or a mixture thereof.

Figure 9:
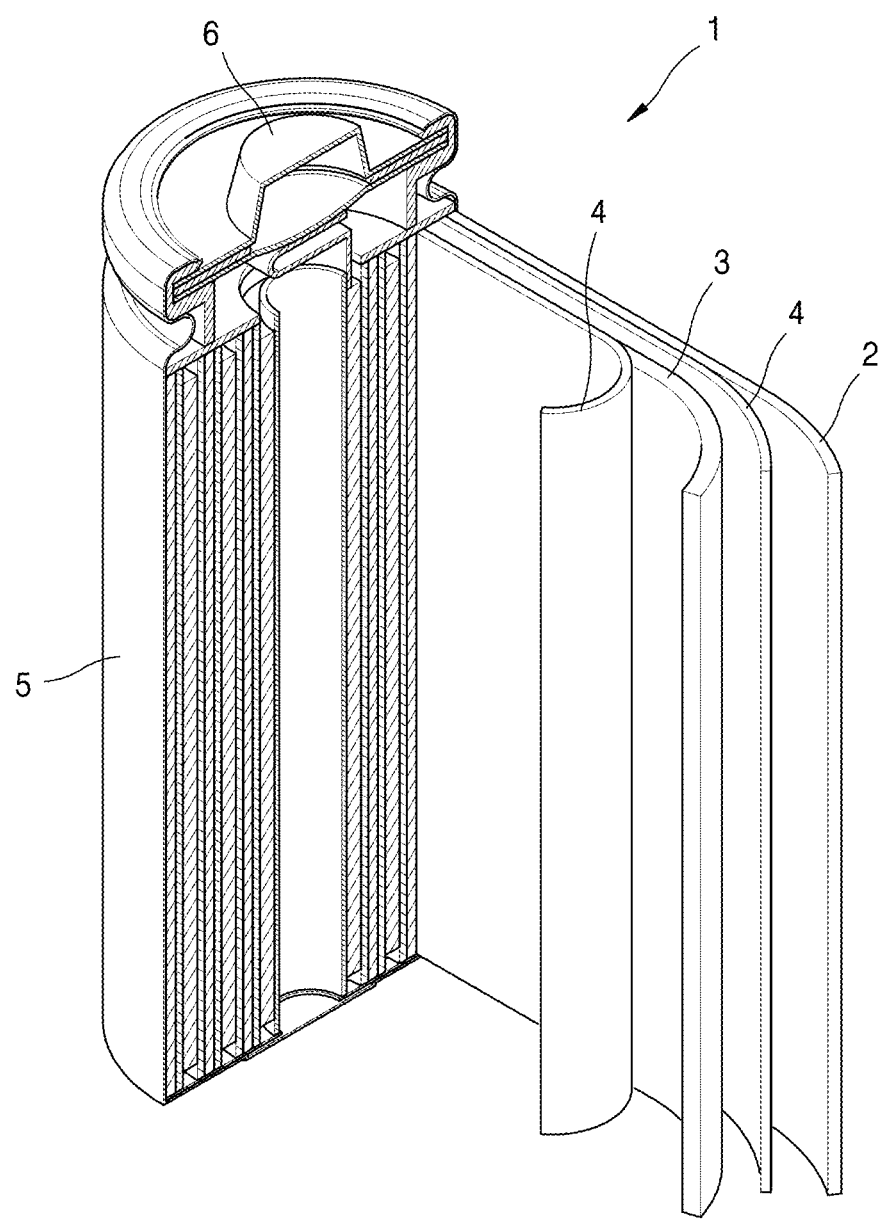
FIG. 9 is a schematic view of an embodiment of a lithium battery.

Referring to FIG. 9, a lithium battery 1 includes a cathode 3, an anode 2, and a separator 4. In some embodiments, the cathode 3, the anode 2, and the separator 4 may be wound or folded, and then sealed in a battery case 5. In some embodiments, the battery case 5 may be filled with an organic electrolytic solution and sealed with a cap assembly 6, thereby completing the manufacture of the lithium battery 1. In some embodiments, the battery case 5 may be a cylindrical type, a rectangular type, or a thin-film type. For example, the lithium battery 1 may be a large-sized thin-film type battery. In some embodiments, the lithium battery 1 may be a lithium ion battery.

In some embodiments, the separator may be disposed between the cathode and the anode to form a battery assembly. In some embodiments, the battery assembly may be stacked in a bi-cell structure and impregnated with the organic electrolytic solution. In some embodiments, the resultant assembly may be put into a pouch and hermetically sealed, thereby completing the manufacture of a lithium ion polymer battery.

In some embodiments, a plurality of battery assemblies may be stacked to form a battery pack, which may be used in any device that requires high capacity and high output, for example, in a laptop computer, a smart phone, or an electric vehicle.

The lithium battery may have improved lifetime characteristics and high rate characteristics, and thus may be used in an electric vehicle (EV), for example, in a hybrid vehicle such as a plug-in hybrid electric vehicle (PHEV). The lithium battery may be applicable to the high-power storage field. For example, the lithium battery may be used in an electric bicycle or a power tool.

When the lithium battery is charged to a high voltage of about 4.5 V or greater with respect to lithium during an initial charging process, the spinel crystal structure belonging to an $Fd\bar{3}m$ space group in the second lithium transition metal oxide of the shell, which is a coating layer, may be activated, and thus an additional charging capacity/discharge capacity may be used. Therefore, an initial charge/discharge capacity of the lithium battery may improve.

According to an embodiment, a method of preparing a composite cathode active material includes preparing a solution comprising a precursor of a second lithium transition metal oxide having a spinel crystal structure; preparing a mixture by mixing the solution and a nickel-containing first lithium transition metal oxide having a layered crystal structure; preparing a dried product by drying the mixture; and heat-treating the dried product.

A precursor of the second lithium transition metal oxide having a spinel crystal structure used in the preparing of the solution including the precursor of the second lithium transition metal oxide may be a nitrate, a sulfate, or a chlorate of a transition metal, but embodiments are not limited thereto, and any suitable soluble salt including a transition metal available in the art may be used. Examples of the soluble salt may include $Co(NO_3)_2 \cdot H_2O$ and $Mn(NO_3)_2 \cdot 4H_2O$. The solution may include the precursor of the second lithium transition metal oxide and a solvent that may dissolve the precursor of the second lithium transition metal oxide. A type of the solvent is not particularly limited, and any suitable solvent available as a solvent in the art may be used. The solvent may be distilled water.

In the preparing of the mixture, an amount of the solution may be about 50 parts by weight or less, about 45 parts by weight or less, about 40 parts by weight or less, about 35 parts by weight or less, about 30 parts by weight or less, about 25 parts by weight or less, about 20 parts by weight or less, or about 10 parts by weight or less, based on 100 parts by weight of the nickel-containing first lithium transition metal oxide. In the mixture, as a concentration of the first lithium transition metal oxide increases, coating a surface and inside of the composite cathode active material may be evenly performed.

In the preparing of the mixture, an amount of a solvent contained in the solution may be about 50 parts by weight or less, about 45 parts by weight or less, about 40 parts by weight or less, about 35 parts by weight or less, about 30 parts by weight or less, about 25 parts by weight or less, about 20 parts by weight or less, or about 10 parts by weight or less, based on 100 parts by weight of the nickel-containing first lithium transition metal oxide. In the mixture, when a concentration of the nickel-containing first lithium transition metal oxide is too low, a surface and inside of the composite cathode active material may not be evenly coated with a composition having a spinel crystal structure.

In the preparing of the mixture, an amount of the precursor of the second lithium transition metal oxide may be about 10 parts by weight or less, about 9 parts by weight or less, about 8 parts by weight or less, about 7 parts by weight or less, about 6 parts by weight or less, about 5 parts by weight or less, about 4 parts by weight or less, about 3.5 parts by weight or less, about 3 parts by weight or less, about 2.5 parts by weight or less, about 2 parts by weight or less, or about 1 part by weight or less, based on 100 parts by weight of the first lithium transition metal oxide.

In the preparing of the dried product, a solvent may be removed. The preparing of the dried product may be performed in an oven at a temperature of 120° C. for about 1 hour to about 30 hours, but the temperature and the period of time are not limited thereto but may be changed within the scope where a composition having a spinel crystal structure may be formed on a surface of the core and in the grain boundary of the composite cathode active material.

The heat-treating of the dried product may be performed at a temperature in a range of about 650° C. to about 800° C., about 650° C. to about 750° C., or about 700° C. to about 750° C., and an oxidizing atmosphere includes an oxidizing gas such as oxygen or air. A period of time for the heat-treating may be in a range of about 3 hours to about 20 hours, about 3 hours to about 15 hours, about 3 hours to about 10 hours, about 3 hours to about 7 hours, or about 4 hours to about 6 hours, but the temperature ranges, atmosphere, or period of time are not limited thereto and may be changed within the scope where a composition having a spinel crystal structure may be formed on a surface of the core and in the grain boundary of the composite cathode active material.

One or more embodiments will now be described in more detail with reference to the following examples. However, these examples are not intended to limit the scope of the one or more embodiments.

EXAMPLES

Preparation of Composite Cathode Active Material

Example 1: Ni91+LiMnCoO$_4$ Spinel 0.5 wt % (Powder:Distilled Water=100:40)

100 parts by weight of Li$_{1.03}$Ni$_{0.91}$Co$_{0.06}$Mn$_{0.03}$O$_2$ powder, as a first lithium transition metal oxide, was prepared.

As a precursor of a second transition metal oxide, 0.5 parts by weight of a precursor mixture including Co(NO$_3$)$_2$·H$_2$O and Mn(NO$_3$)$_2$·4H$_2$O at a molar ratio of 1:1 was prepared. The precursor mixture was added to 40 parts by weight of distilled water, and the resultant was stirred at 80° C. for 1 minute to prepare an aqueous solution.

The aqueous solution thus prepared was added to 100 parts by weight of Li$_{1.03}$Ni$_{0.91}$Co$_{0.06}$Mn$_{0.03}$O$_2$ powder, and the resultant was stirred at 80° C. for 5 minutes to prepare a mixture.

The mixture was dried in an oven at 120° C. for 12 hours to prepare a dried product.

The dried product was placed in a furnace and heat-treated therein under a flow of oxygen at 720° C. for 5 hours to prepare a composite cathode active material.

During the heat-treating process, a LiMnCoO$_4$ coating layer having a spinel crystal structure was formed on a surface of a Li$_{1.03}$Ni$_{0.91}$Co$_{0.06}$Mn$_{0.03}$O$_2$ core and in a grain boundary between adjacent primary particles among a plurality of primary particles.

Example 2: Ni91+LiMnCoO$_4$ Spinel 1.0 wt % (Powder:Distilled Water=100:40)

A composite cathode active material was prepared in the same manner as in Example 1, except that 1 part by weight of a precursor mixture including Co(NO$_3$)$_2$·H$_2$O and Mn(NO$_3$)$_2$·4H$_2$O at a molar ratio of 1:1, as a precursor of a second transition metal oxide, based on 100 parts by weight of Li$_{1.03}$Ni$_{0.91}$Co$_{0.06}$Mn$_{0.03}$O$_2$ powder, as a first lithium transition metal oxide, was used.

During the heat-treating process, a LiMnCoO$_4$ coating layer having a spinel crystal structure was formed on a surface of a Li$_{1.03}$Ni$_{0.91}$Co$_{0.06}$Mn$_{0.03}$O$_2$ core and in a grain boundary between adjacent primary particles among a plurality of primary particles.

Example 3: Ni91+LiMnCoO$_4$ Spinel 2.0 wt % (Powder:Distilled Water=100:40)

A composite cathode active material was prepared in the same manner as in Example 1, except that 2 parts by weight of a precursor mixture including Co(NO$_3$)$_2$·H$_2$O and Mn(NO$_3$)$_2$·4H$_2$O at a molar ratio of 1:1, as a precursor of a second transition metal oxide, based on 100 parts by weight of Li$_{1.03}$Ni$_{0.91}$Co$_{0.06}$Mn$_{0.03}$O$_2$ powder, as a first lithium transition metal oxide, was used.

During the heat-treating process, a LiMnCoO$_4$ coating layer having a spinel crystal structure was formed on a surface of a Li$_{1.03}$Ni$_{0.91}$Co$_{0.06}$Mn$_{0.03}$O$_2$ core and in a grain boundary between adjacent primary particles among a plurality of primary particles.

Example 4: Ni91+LiMnCoO$_4$ Spinel 8.0 wt % (Powder:Distilled Water=100:40)

A composite cathode active material was prepared in the same manner as in Example 1, except that 8 parts by weight of a precursor mixture including Co(NO$_3$)$_2$·H$_2$O and Mn(NO$_3$)$_2$·4H$_2$O at a molar ratio of 1:1, as a precursor of a second transition metal oxide, based on 100 parts by weight of Li$_{1.03}$Ni$_{0.91}$Co$_{0.06}$Mn$_{0.03}$O$_2$ powder, as a first lithium transition metal oxide, was used.

During the heat-treating process, a LiMnCoO$_4$ coating layer having a spinel crystal structure was formed on a surface of a Li$_{1.03}$Ni$_{0.91}$Co$_{0.06}$Mn$_{0.03}$O$_2$ core and in a grain boundary between adjacent primary particles.

Comparative Example 1: Ni91 Alone

Li$_{1.03}$Ni$_{0.91}$Co$_{0.06}$Mn$_{0.03}$O$_2$ powder, as a first lithium transition metal oxide, was used alone as a composite cathode active material.

Comparative Example 2: Ni91+LiMnCoO$_4$ Spinel 1 wt % (Powder:Distilled Water=100:100)

100 parts by weight of Li$_{1.03}$Ni$_{0.91}$Co$_{0.06}$Mn$_{0.03}$O$_2$ powder, as a first lithium transition metal oxide, was prepared.

As a precursor of a second transition metal oxide, 1 part by weight of a precursor mixture including Co(NO$_3$)$_2$·H$_2$O and Mn(NO$_3$)$_2$·4H$_2$O at a molar ratio of 1:1 was prepared.

The precursor mixture was added to 100 parts by weight of distilled water, and the resultant was stirred at 80° C. for 1 minute to prepare an aqueous solution.

The aqueous solution thus prepared was added to 100 parts by weight of $Li_{1.03}Ni_{0.91}Co_{0.06}Mn_{0.03}O_2$ powder, and the resultant was stirred at 80° C. for 5 minutes to prepare a mixture.

The mixture was dried in an oven at 120° C. for 12 hours to prepare a dried product.

The dried product was placed in a furnace and heat-treated therein under a flow of oxygen at 720° C. for 5 hours to prepare a composite cathode active material.

During the heat-treating process, a $LiMnCoO_4$ coating layer having a spinel crystal structure was formed on a surface of a $Li_{1.03}Ni_{0.91}Co_{0.06}Mn_{0.03}O_2$ core.

Manufacture of Half Cell

Example 5

Preparation of Cathode

The composite cathode active material prepared in Example 1, a carbonaceous conducting agent (Denka Black), and polyvinylidene fluoride (PVdF) at a weight ratio of 92:4:4 were mixed to prepare a mixture. The mixture was mixed with N-methyl-pyrrolidone (NMP) in an agate mortar to prepare a slurry. The slurry was bar-coated on an aluminum current collector having a thickness of about 15 μm, dried at room temperature, dried again in vacuum at 120° C., and then roll-pressed and punched to prepare a cathode plate having a thickness of about 55 μm.

Manufacture of Coin Cell

The cathode plate was used as a cathode, lithium was used as a counter electrode, a PTFE separator was used as a separator, and a solution prepared by dissolving 1.15 Molar $LiPF_6$ in a solvent mixture including ethylene carbonate (EC)+ethylmethylcarbonate (EMC)+dimethyl carbonate (DMC) at a volume ratio of 3:4:3 was used as an electrolyte, and thus a coin cell was manufactured.

Examples 6 to 8

Coin cells were each manufactured in the same manner as in Example 5, except that each of the composite cathode active materials prepared in Examples 2 to 4 was used instead of the composite cathode active material prepared in Example 1.

Comparative Examples 3 and 4

Coin cell were each manufactured in the same manner as in Example 5, except that each of the composite cathode active materials prepared in Comparative Examples 1 and 2 was used instead of the composite cathode active material prepared in Example 1.

Evaluation Example 1: XRD Spectrum Evaluation

Figure 2:
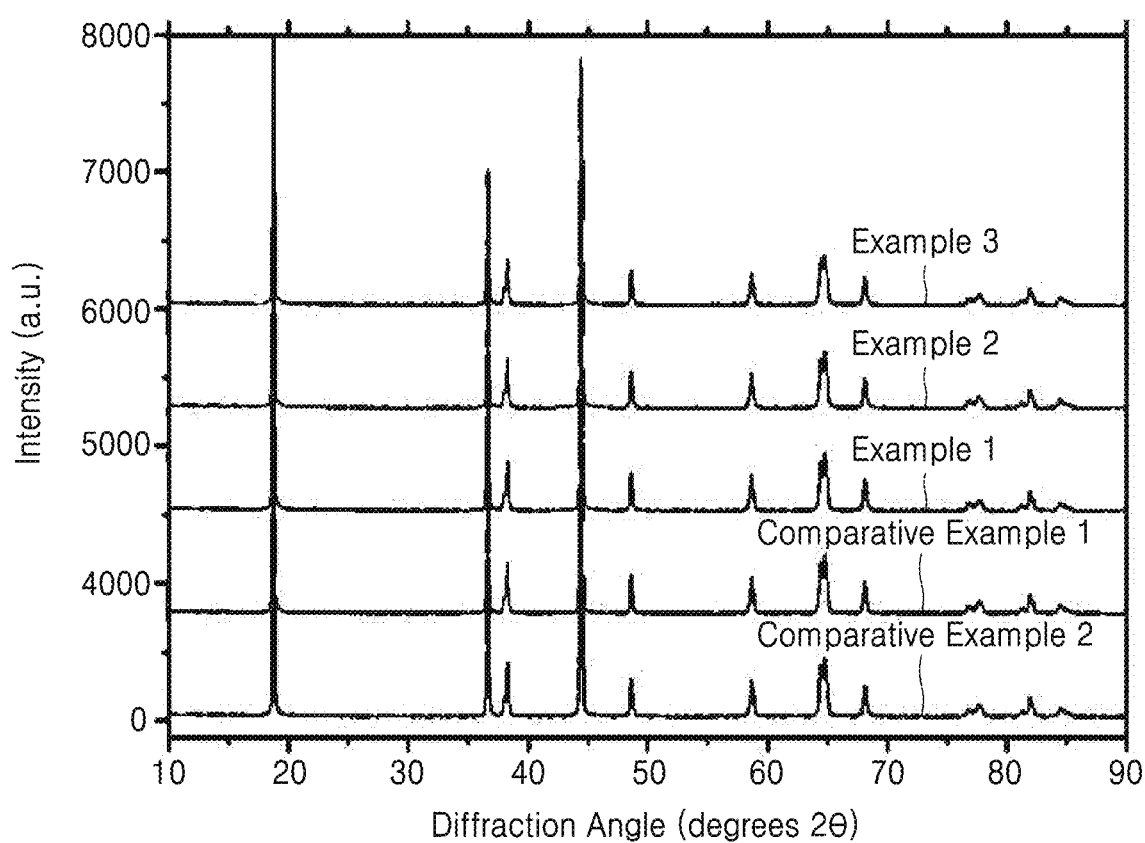
FIG. 2 is a graph of intensity (arbitrary units, a.u.) versus diffraction angle (degrees 2-theta) showing the results of X-ray diffraction ("XRD") analysis of composite cathode active materials prepared in Examples 1 to 3 and Comparative Examples 1 and 2.

As shown in FIG. 2, the XRD spectrum of the composite cathode active materials prepared in Examples 1 to 3 and Comparative Examples 1 and 2 were substantially the same. Thus, it was confirmed that structural change of $Li_{1.03}Ni_{0.91}Co_{0.06}Mn_{0.03}O_2$ due to coating did not occur or was insignificant.

Evaluation Example 2: Raman Spectrum Evaluation

Figure 3:
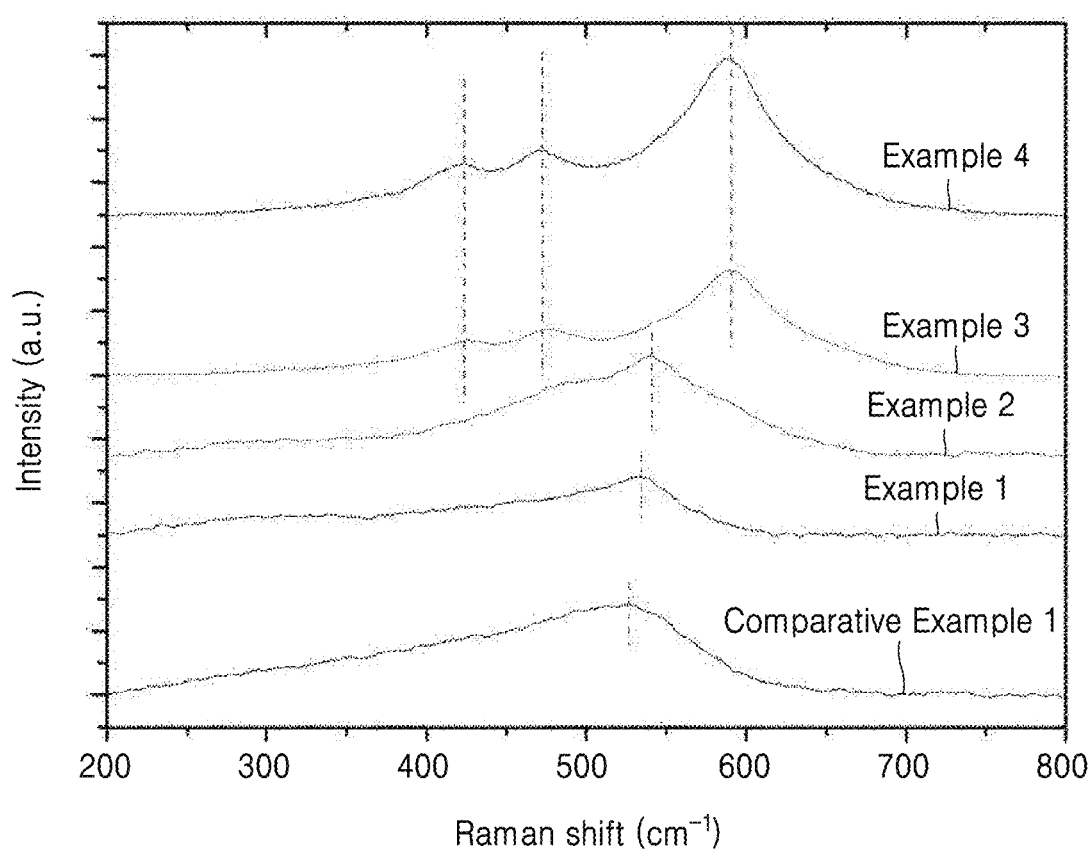
FIG. 3 is a graph of intensity (a.u.) versus Raman shift ($cm^{-1}$) showing the results of Raman analysis of composite cathode active materials prepared in Examples 1 to 4 and Comparative Example 1.

As shown in FIG. 3, maximum peaks of the composite cathode active materials prepared in Examples 1 to 4 in the Raman spectrum shifted right as those were 530 $cm^{-1}$ or greater.

The shift of the maximum peaks shows that a coating layer having a spinel crystal structure was formed in and on the core of the first lithium transition metal oxide.

Evaluation Example 3: Surface Composition Evaluation

Figure 4A:
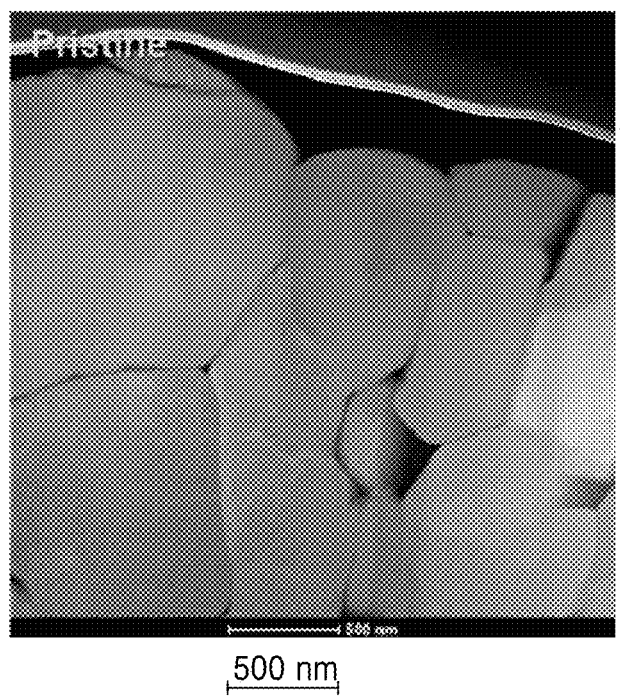
FIGS. 4A to 4C are images of a cross-section of the composite cathode active material prepared in Comparative Example 1, obtained via high-angle annular dark field image ("HAADF") scanning transmission electron microscopy ("STEM") and energy dispersive X-ray spectroscopy ("EDS")
Figure 4B:
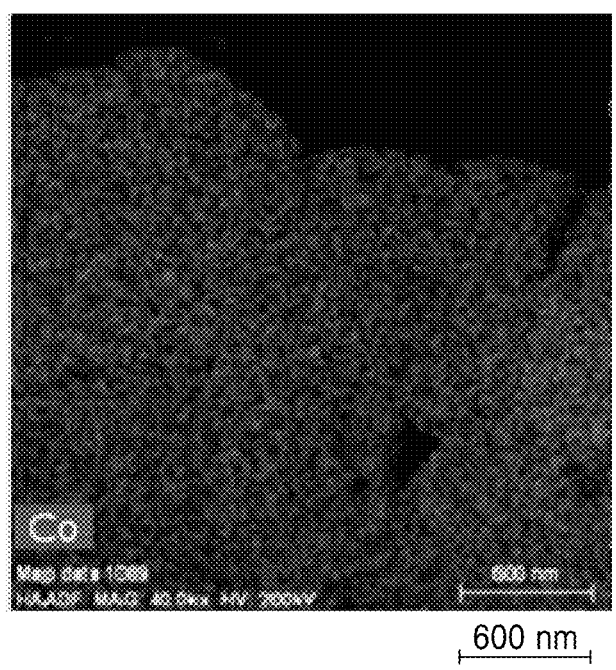
Figure 4C:
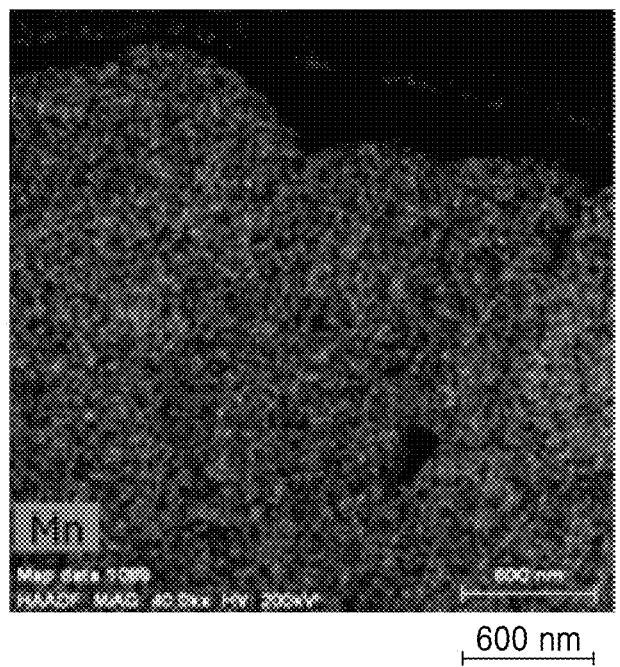
Figure 5A:
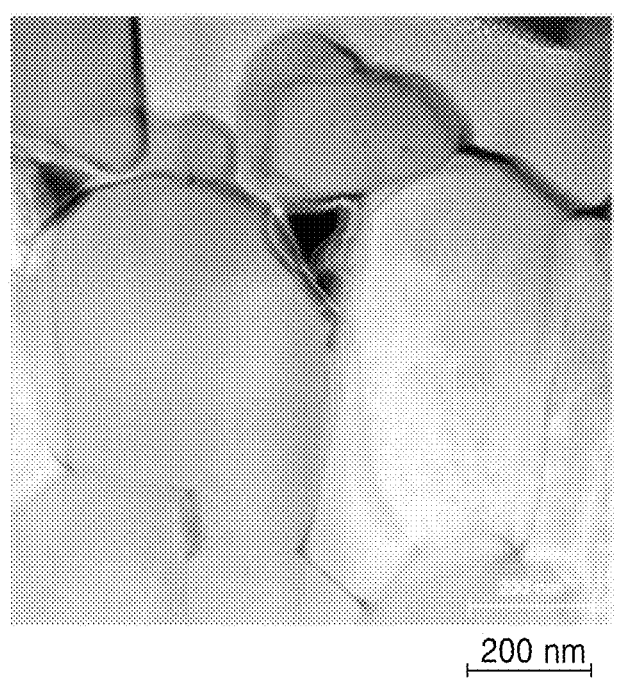
FIGS. 5A to 5E are HAADF STEM and EDS images of a surface of the composite cathode active material prepared in Comparative Example 2.
Figure 5B:
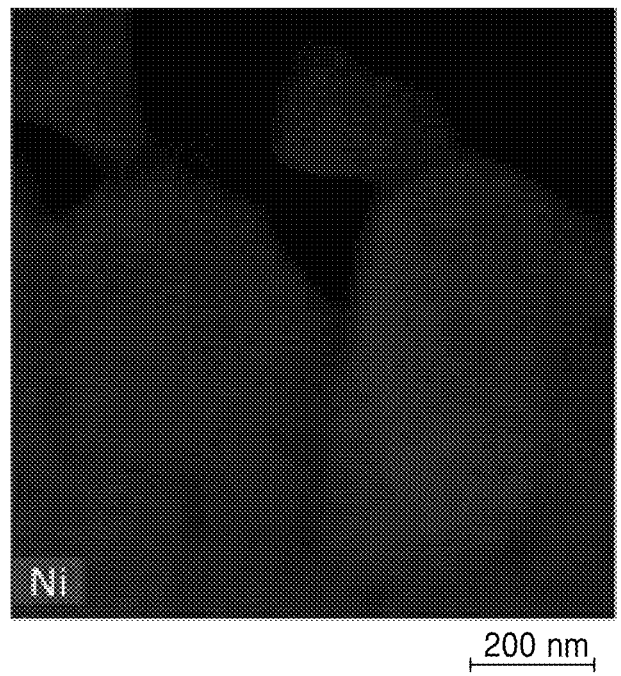
Figure 5C:
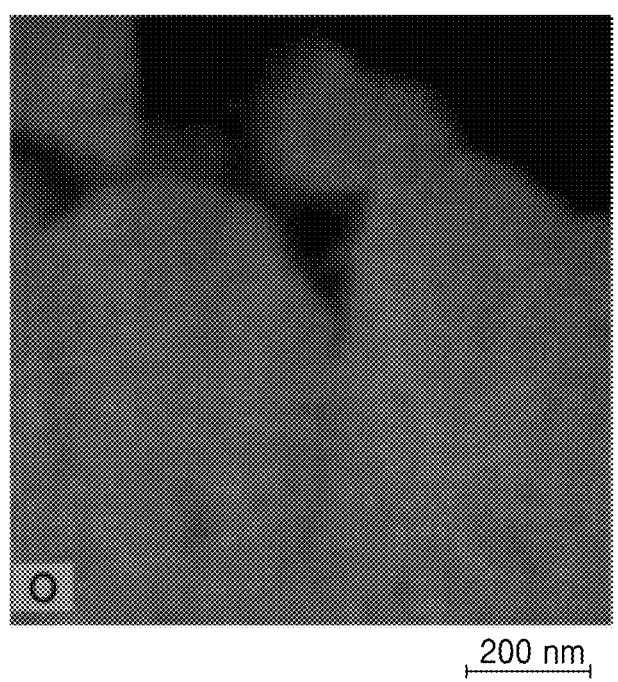
Figure 5D:
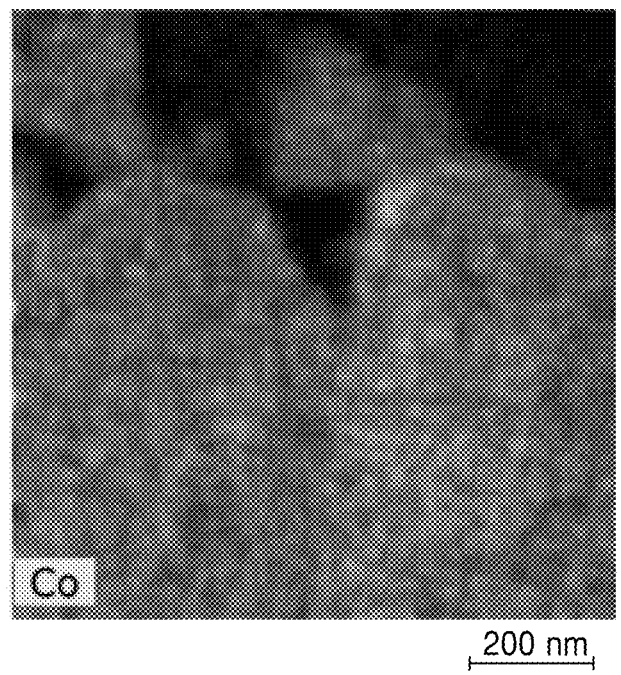
Figure 5E:
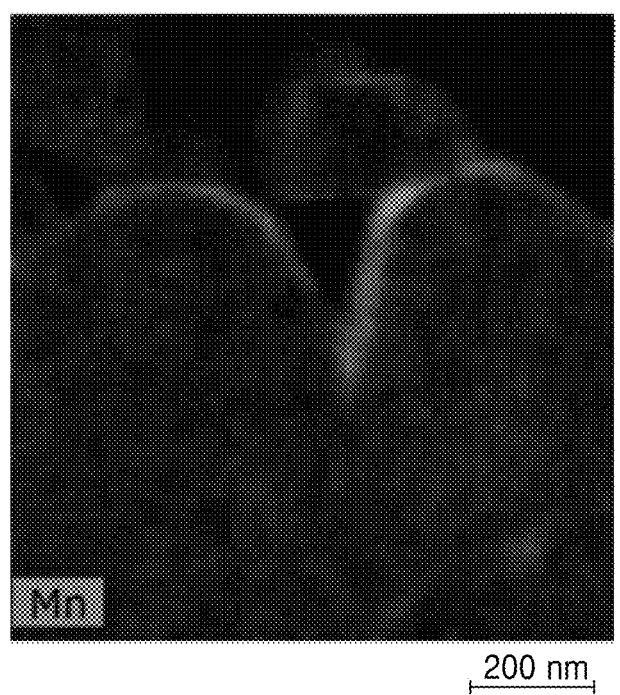

FIGS. 4A to 4C are high-angle annular dark field image (HAADF) STEM and energy dispersive X-ray spectroscopy (EDS) images of the composite cathode active material prepared in Comparative Example 1, where the composite cathode active material was formed when a plurality of primary particles agglomerate each other.

FIGS. 5A to 5E are HAADF STEM and EDS images of the composite cathode active material prepared in Comparative Example 2, where the composite cathode active material included a secondary particle core, which was formed when a plurality of primary particles agglomerate each other, and a spinel coating layer disposed on the core.

FIGS. 6A to 6F are HAADF STEM and EDS images of a surface of the composite cathode active material prepared in Example 3, wherein the composite cathode active material included a secondary particle core, which was formed when a plurality of primary particles agglomerate each other, and a coating layer disposed in a grain boundary in the core and on a surface of the core.

As shown in FIGS. 4A to 4C, it was confirmed that Co and Mn were evenly distributed throughout the whole core.

As shown in FIGS. 5B to 5E, it was confirmed that Ni and O were evenly distributed throughout the whole core, and Co and Mn were found at greater concentrations in the coating layer on a surface of the core compared to those in the core.

Therefore, it was confirmed that only the surface of the core was coated with $LiMnCoO_4$ and had a coating layer.

As shown in FIGS. 6B to 6E, it was confirmed that Co and Mn were found at relatively high concentrations in the grain boundary between primary particles in the core and in the coating layer on a surface of the core.

Figure 6A:
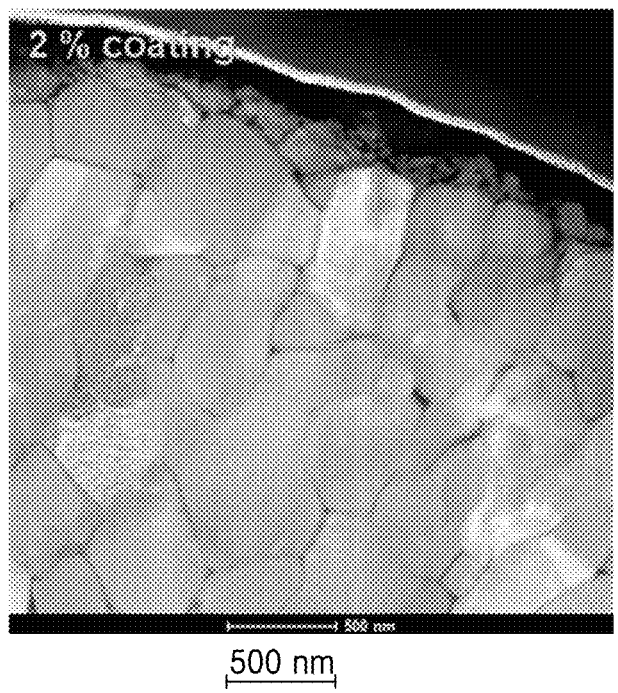
FIGS. 6A to 6F are HAADF STEM and EDS images of a surface of the composite cathode active material prepared in Example 3.
Figure 6B:
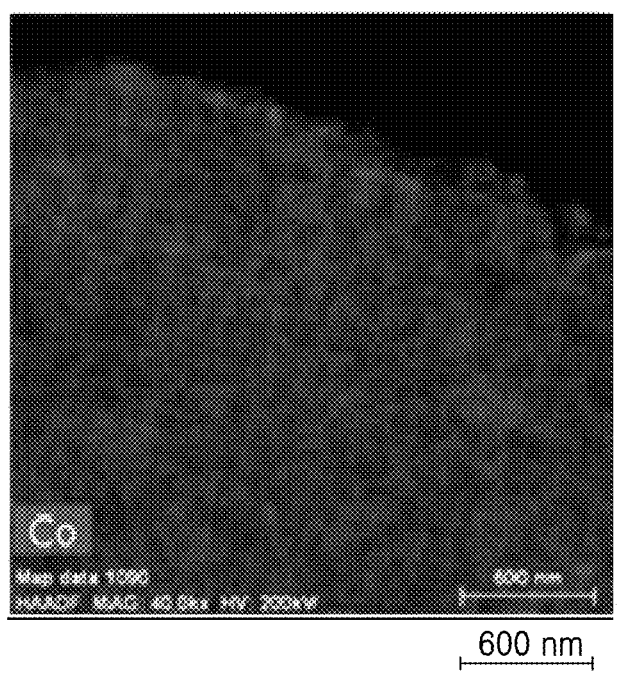
Figure 6C:
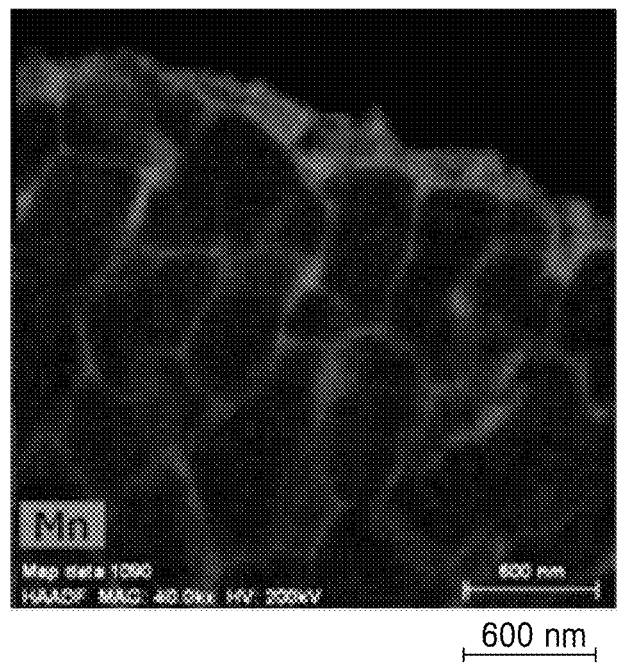

As shown in FIG. 6C, it was confirmed that Mn was found at relatively high concentrations in the grain boundary between primary particles in the core and on a surface of the core but at a very low concentration in the primary particles.

Figure 6D:
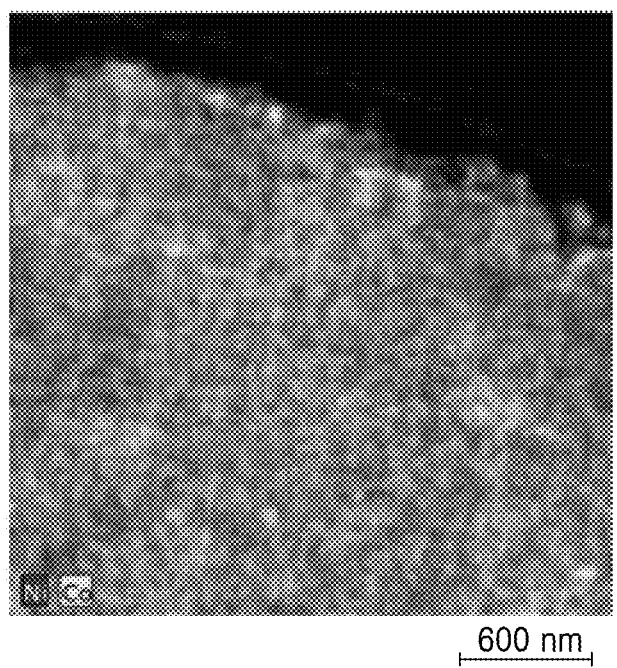
Figure 6E:
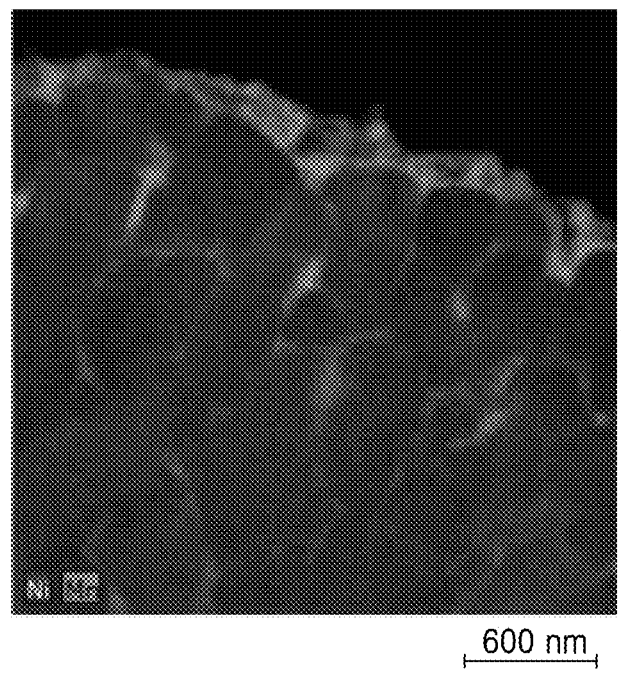

As shown in FIG. 6E, it was confirmed that Ni and Mn were found at the same time, and Ni was disposed in the primary particles whereas Mn was hardly found in the primary particles but found at a high concentration in the grain boundary between the primary particles and on a surface of the core.

In FIG. 6B, location of Co was not significant, but referring to FIG. 6D where Ni and Co are both shown, Co shown in green was found in the grain boundary including Ni between the primary particles and on a surface of the core.

Figure 6F:
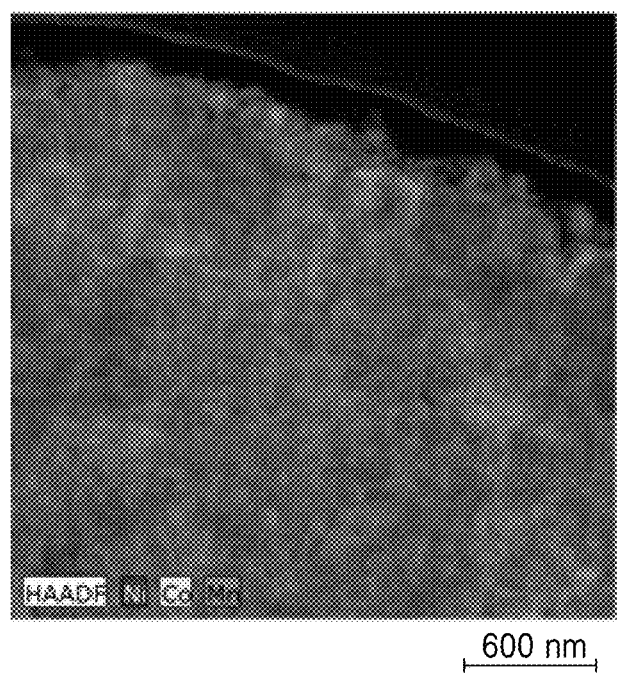
Figure 7A:
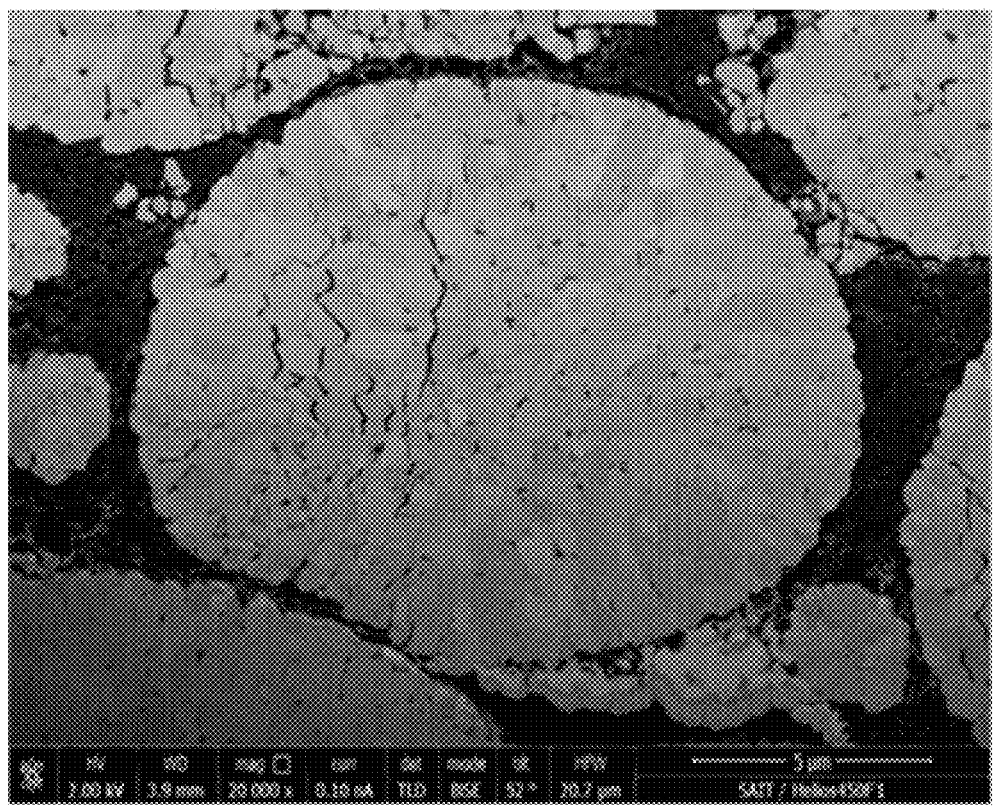
FIGS. 7A and 7B are scanning electron microscope images of the cross-section of the composite cathode active material prepared in Comparative Example 1 before and after 50 charge/discharge cycles.
Figure 7B:
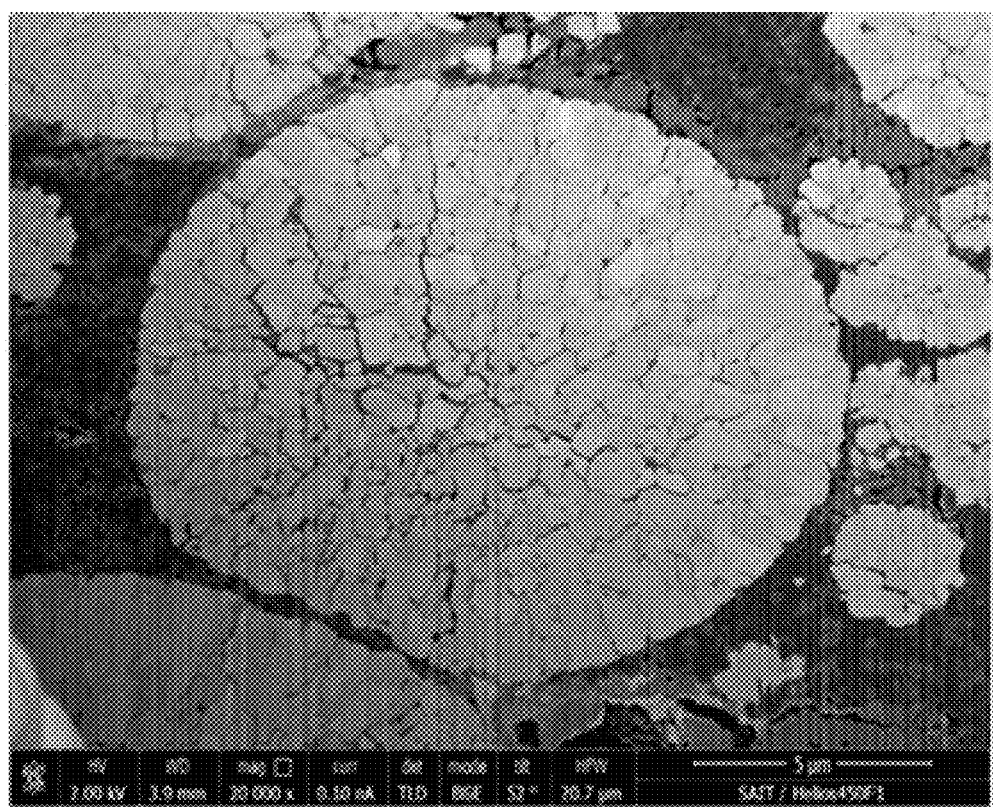

In FIG. 6F, Ni, Co, and Mn are shown at the same time. It was confirmed that Ni was found in the primary particles in the core, Co and Ni were found between the primary particles, and Co and Ni were found on a surface of the core. In FIG. 6F, Mn in red and Co in green are overlapped and thus shown in orange.

Therefore, it was confirmed that $LiMnCoO_4$ was evenly coated on all of the core surface and in the grain boundary between the primary particles in the core.

Evaluation Example 4: Evaluation of Amount of Lithium Residue

Amounts of lithium residue on surfaces of the composite cathode active materials prepared in Examples 1 to 4 and Comparative Examples 1 and 2 were measured, and some of the results are shown in Table 1.

The amounts of the lithium residue were evaluated by measuring Li amounts in LiCO₃ and LiOH remaining on a surface of the composite cathode active material by using a wet method (or a titration method).

Details about the measuring method may be, for example, found in paragraph [0054] of Japanese Patent No. 2016-081903, the content of which is incorporated herein, in its entirety, by reference.

TABLE 1

|  | Amount of lithium residue (ppm) |
| --- | --- |
| Comparative Example 1 | 2552 |
| Comparative Example 2 | 2127 |
| Example 1 | 1626 |
| Example 2 | 1429 |
| Example 3 | 1174 |

As shown in Table 1, amounts of lithium residues of the composite cathode active materials of Examples 1 to 3 decreased compared to that of the composite cathode active material of Comparative Example 1.

While not wanting to be bound by theory, it is believed that such decrease may have been a result of the fact that a coating layer having a spinel structure formed on a surface of and inside the core as a result of a reaction between the lithium residue on a surface of the first lithium transition metal oxide and a precursor of the second lithium transition metal oxide.

Therefore, gas occurrence during a charge/discharge of a lithium battery including each of the composite cathode active materials prepared in Examples 1 to 3 may be suppressed, and thus deterioration of lifetime characteristics may be suppressed.

Evaluation Example 5: Charge/Discharge Characteristic Evaluation

At a temperature of 25° C., each of the lithium batteries prepared in Examples 5 to 8 and Comparative Examples 3 and 4 was charged at a constant current of 0.1 C rate until a voltage was 4.35 V (vs. Li), and then while maintaining the voltage at 4.35 V in a constant voltage mode, the current was cut-off at a current of 0.05 C rate. Next, the batteries were each discharged at a constant current of 0.1 C rate until a voltage was 2.8 V (vs. Li) (the $1^{st}$ cycle, a formation process).

At 25° C., each of the lithium batteries that underwent the $1^{st}$ cycle was charged at a constant current of 0.33 C rate until a voltage was 4.35 V (vs. Li), and then while maintaining the voltage at 4.35 V in a constant voltage mode, the current was cut-off at a current of 0.05 C rate. Next, the batteries were each discharged at a constant current of 0.2 C rate until a voltage was 2.8 V (vs. Li) (the $2^{nd}$ cycle).

At 25° C., each of the lithium batteries that underwent the 2 nd cycle was charged at a constant current of 0.33 C rate until a voltage was 4.35 V (vs. Li), and then while maintaining the voltage at 4.35 V in a constant voltage mode, the current was cut-off at a current of 0.05 C rate. Next, the batteries were each discharged at a constant current of 0.3 C rate until a voltage was 2.8 V (vs. Li) (the $3^{rd}$ cycle).

At 25° C., each of the lithium batteries that underwent the $3^{rd}$ cycle was charged at a constant current of 0.33 C rate until a voltage was 4.35 V (vs. Li), and then while maintaining the voltage at 4.35 V in a constant voltage mode, the current was cut-off at a current of 0.05 C rate. Next, the batteries were each discharged at a constant current of 1 C rate until a voltage was 2.8 V (vs. Li) (the 4th cycle).

At 25° C., each of the lithium batteries that underwent the 4th cycle was charged at a constant current of 0.33 C rate until a voltage was 4.35 V (vs. Li), and then while maintaining the voltage at 4.35 V in a constant voltage mode, the current was cut-off at a current of 0.05 C rate. Next, the batteries were each discharged at a constant current of 2 C rate until a voltage was 2.8 V (vs. Li) (the 5th cycle).

At 25° C., each of the lithium batteries that underwent the 5th cycle was charged at a constant current of 0.33 C rate until a voltage was 4.35 V (vs. Li), and then while maintaining the voltage at 4.35 V in a constant voltage mode, the current was cut-off at a current of 0.05 C rate. Next, the batteries were each discharged at a constant current of 3 C rate until a voltage was 2.8 V (vs. Li) (the 6th cycle).

At 25° C., each of the lithium batteries that underwent the 6th cycle was charged at a constant current of 0.33 C rate until a voltage was 4.35 V (vs. Li), and then while maintaining the voltage at 4.35 V in a constant voltage mode, the current was cut-off at a current of 0.05 C rate. Next, the batteries were each discharged at a constant current of 1 C rate until a voltage was 2.8 V (vs. Li) (the 7th cycle), and this cycle was repeated 50 times under the same conditions until the 56th cycles.

10 minutes of retention time was allowed after each set of charge/discharge cycles in the whole charge/discharge cycles.

Some of the results of the charge/discharge test are shown in Table 6. A crack growth at the 56th cycle, a capacity retention at the 56th cycle, and an initial charge/discharge efficiency and high rate characteristic at the 1st cycle are defined by Equations 2 to 5, each respectively.

Crack growth (%)=[(pore area of cross-section of composite cathode active material particles after the $56^{th}$ cycle—pore area of cross-section of composite cathode active material particles after the $6^{th}$ cycle/pore area of cross-section of composite cathode active material particles after the $6^{th}$ cycle]×100%  Equation 2

Capacity retention (%)=[Discharge capacity at the $56^{th}$ cycle/Discharge capacity at the $7^{th}$ cycle]×100%  Equation 3

Initial efficiency (%)=[Discharge capacity at the $1^{st}$ cycle/Charge capacity at the $1^{st}$ cycle]×100%  Equation 4

High rate characteristic (%)=[Discharge capacity at the $4^{th}$ cycle (2 C rate)/Discharge capacity at the $2^{nd}$ cycle (0.2 C rate)]×100%  Equation 5

TABLE 2

|  | Charge capacity at the 1st cycle (mAh/g) | Initial efficiency (%) | High rate characteristic (%) | Discharge capacity at the 7th cycle (mAh/g) | Capacity retention (%) | Crack growth (%) |
|---|---|---|---|---|---|---|
| Comparative Example 3 | 247 | 92 | 88 | 190 | 69.6 | 6.5 |
| Comparative Example 4 | 239 | 90 | 92 | 200 | 90.9 | — |
| Example 5 | 229 | 90 | 92 | 200 | 90.9 | — |
| Example 6 | 243 | 88 | 94 | 205 | 92.6 | — |
| Example 7 | 246 | 91 | 92 | 210 | 93.3 | 5.7 |

As shown in Table 2, the lithium batteries of Examples 5 to 7 had significantly improved capacity retentions compared to that of the lithium battery of Comparative Example 3 including an uncoated composite cathode active material.

In the lithium batteries of Examples 5 to 7, the composite cathode active material further includes a shell in the form of a coating layer having a spinel crystal structure, which has 3-dimensional lithium ion transferring pathways, on a layered core. Thus, while not wanting to be bound by theory, it is believed that that capacity retentions of the lithium batteries of Examples 5 to 7 significantly improved because the composite cathode active material added with a coating layer having a spinel crystal structure on a surface thereof has improved charge/discharge characteristics provided by the lithium ion transferring pathways, compared to the composite cathode active material of Comparative Example 1 which only has a layered crystal structure.

Also, discharge capacities and capacity retentions of the lithium batteries of Examples 5 to 7 were the same or improved compared to those of the lithium battery of Comparative Example 4 including the composite cathode active material only coated on a surface of the core. Particularly, both a discharge capacity and a capacity retention of the lithium battery of Example 6 including the composite cathode active material coated with a spinel layer at the same amount with that of the lithium battery of Comparative Example 4 improved.

While not wanting to be bound by theory, it is believed that such improvement may have been a result of the fact that the composite cathode active material in the lithium batteries of Examples 5 to 7 further includes a coating layer having a spinel crystal structure that provides 3-dimensional lithium ion transfer pathways in a grain boundary between primary particles in a layered core, which facilitates lithium ion conduction in the core, and thus elution of metal ions from the primary particles in the layered core to an electrolyte solution is suppressed. Also, it is believed that a side reaction with the electrolyte solution in the grain boundary between the primary particles in the layered core is suppressed.

Further, in the lithium battery of Example 7, a crack growth of the composite cathode active material decreased and thus mechanical strength of the composite cathode active material increased, compared to that of the lithium battery of Comparative Example 3. This decreased of the crack growth is believed to have been a result of the fact that the coating layer having a spinel crystal structure disposed in the grain boundary between the primary particles absorbed volume change of the primary particles according to the charge/discharge process and suppressed crack between the primary particles.

As described above, according to an aspect of one or more embodiments, when a composite cathode active material includes a composition having a spinel crystal structure in a core and on a surface of the core, charge/discharge characteristics of a lithium battery including the composite cathode active material may improve.

It should be understood that embodiments described herein shall be considered in a descriptive sense only and not for purposes of limitation. Descriptions of features or aspects within each embodiment should be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. A composite cathode active material comprising:
a core comprising a plurality of primary particles comprising a nickel-containing first lithium transition metal oxide having a layered crystal structure, and
a grain boundary between adjacent primary particles of the plurality of primary particles; and
a shell on the core, the shell comprising a second lithium transition metal oxide having a spinel crystal structure,
wherein the grain boundary comprises a first composition having a spinel crystal structure,
wherein a concentration of manganese and cobalt in the grain boundary is greater than a concentration of manganese and cobalt in the primary particles respectively, and
wherein the second lithium transition metal oxide is represented by Formula 7:

$$\text{Li}_a\text{Mn}_b\text{Co}_c\text{M5'}_d\text{O}_4 \qquad \text{Formula 7}$$

wherein, in Formula 7,
M5' comprises vanadium, chromium, iron, zirconium, rhenium, aluminum, boron, germanium, ruthenium, tin, titanium, niobium, molybdenum, or platinum,
0.9≤a≤1.1, 0<b<2.0, 0<c<2.0, 0≤d<0.1, and b+c+d=2.

2. The composite cathode active material of claim 1, wherein at least 50% of the grain boundaries between the adjacent primary particles of the plurality of primary particles comprise the first composition.

3. The composite cathode active material of claim 1, wherein the grain boundary is substantially rectilinear in cross-section within the core.

4. The composite cathode active material of claim 1, wherein the grain boundary is arranged in a direction which is parallel to a surface of an adjacent primary particle of the adjacent primary particles, and wherein the direction of the grain boundary is different from a direction of a tangent of a nearest surface of the core.

5. The composite cathode active material of claim 1, wherein the core comprises a first grain boundary and a second grain boundary,
wherein the first grain boundary and the second grain boundary are located directly on a same primary particle of the plurality of primary particles, and
wherein the first grain boundary and the second grain boundary intersect at an angle determined by a shape of the same primary particle.

6. The composite cathode active material of claim 1, wherein the core comprises a plurality of grain boundaries that are adjacent to the plurality of primary particles,
wherein the plurality of grain boundaries are each arranged in a direction parallel to a surface of an adjacent primary particle, and
wherein grain boundaries of the plurality of grain boundaries are arranged in different directions than each other.

7. The composite cathode active material of claim 1, wherein a plurality of grain boundaries have an average length in a range of about 50 nanometers to about 1000 nanometers and an average thickness in a range of about 1 nanometers to about 200 nanometers,
wherein a direction of the length is parallel to a surface of an adjacent primary particle, and
wherein a direction of the thickness is perpendicular to the surface of the adjacent primary particle.

8. The composite cathode active material of claim 1, wherein the spinel crystal structure has cubic symmetry.

9. The composite cathode active material of claim 8, wherein the spinel crystal structure belongs to an Fd$\bar{3}$m space group.

10. The composite cathode active material of claim 1, wherein the grain boundary further comprises a second composition, and wherein the second composition comprises a lithium transition metal oxide, a lithium-free transition metal oxide, or a combination thereof.

11. The composite cathode active material of claim 10, wherein the second composition has an amorphous structure, a layered structure, a spinel structure, a polyvalent anion crystal structure, or a combination thereof.

12. The composite cathode active material of claim 1, wherein the nickel-containing first lithium transition metal oxide is represented by Formula 1:

Li$_a$MO$_2$      Formula 1 wherein, in Formula 1,
M comprises nickel and at least one non-nickel Group 4 to Group 13 element,
an amount of nickel is in a range of about 70 mole percent to less than about 100 mol percent, based on a total content of M, and
0.9≤a≤1.1.

13. The composite cathode active material of claim 1, wherein the nickel-containing first lithium transition metal oxide is represented by Formula 2:

Li$_a$Ni$_b$M1$_c$M2$_d$M3$_e$O$_2$      Formula 2 wherein, in Formula 2, M1, M2, and M3 are different and each independently comprises manganese, vanadium, chromium, iron, cobalt, zirconium, rhenium, aluminum, boron, germanium, ruthenium, tin, titanium, niobium, molybdenum, or platinum; and 0.9≤a≤1.1, 0.7<b<1.0, 0<c<0.3, 0<d<0.3, 0≤e<0.1, and b+c+d+e=1.

14. The composite cathode active material of claim 1, wherein the nickel-containing first lithium transition metal oxide is represented by Formula 4c:

aLi$_2$MnO$_3$·(1-a)LiM''O$_2$      Formula 4c wherein, in Formula 4c,
M'' comprises nickel and cobalt, manganese, vanadium, chromium, iron, zirconium, rhenium, aluminum, boron, germanium, ruthenium, tin, titanium, niobium, molybdenum, platinum, or a combination thereof, and
0<a<1.

15. The composite cathode active material of claim 1, wherein a thickness of the shell is about 300 nanometers or less.

16. The composite cathode active material of claim 1, wherein a sum of an amount of the second lithium transition metal oxide and an amount of the first composition is about 10 weight percent or less, based on a total weight of the composite cathode active material.

17. The composite cathode active material of claim 1, wherein a crack growth of a cross-section of the composite cathode active material after 50 charge/discharge cycles of a lithium battery comprising the composite cathode active material is about 6% or less, and wherein the crack growth is defined by Equation 1:

Crack growth (%)=[(pore area of cross-section of composite cathode active material particles after 50 charge/discharge cycles−pore area of cross-section of composite cathode active material particles before charge/discharge cycles)/pore area of cross-section of composite cathode active material particles before charge/discharge cycles]×100%.      Equation 1

18. A cathode comprising the composite cathode active material of claim 1.

19. A lithium battery comprising:
the cathode of claim 18;
an anode; and
an electrolyte between the cathode and the anode.

20. A method of preparing the composite cathode active material of claim 1, the method comprising:
providing a solution comprising a precursor of the second lithium transition metal oxide having a spinel crystal structure;
mixing the solution and the nickel-containing first lithium transition metal oxide having a layered crystal structure to prepare a mixture;
drying the mixture to prepare a dried product; and
heat-treating the dried product to prepare the composite cathode active material.

21. The method of claim 20, wherein an amount of the solution in the mixture is about 50 parts by weight or less, based on 100 parts by weight of the nickel-containing first lithium transition metal oxide.

22. The composite cathode active material of claim 1, wherein the nickel-containing first lithium transition metal oxide is represented by Formula 3:

Li$_a$Ni$_b$Co$_c$Mn$_d$M3'$_e$O$_2$      Formula 3 wherein, in Formula 3,
M3' comprises vanadium, chromium, iron, zirconium, rhenium, aluminum, boron, germanium, ruthenium, tin, titanium, niobium, molybdenum, or platinum, and
0.9≤a≤1.1, 0.7<b<1.0, 0<c<0.3, 0<d<0.3, 0≤e<0.1, and b+c+d+e=1.

23. A composite cathode active material comprising:
a core comprising
a plurality of primary particles comprising a nickel-containing first lithium transition metal oxide having a layered crystal structure, and
a grain boundary between adjacent primary particles of the plurality of primary particles; and
a shell on the core, the shell comprising a second lithium transition metal oxide having a spinel crystal structure,
wherein the grain boundary comprises a first composition having a spinel crystal structure,
wherein a concentration of manganese in the grain boundary is greater than a concentration of manganese in the primary particles, and
wherein the nickel-containing first lithium transition metal oxide is represented by Formula 2a or Formula 3:

$$Li_aNi_bM1_cM2_dM3_eO_2 \quad \text{Formula 2a}$$

wherein, in Formula 2a, M1 comprises cobalt, M2 comprises aluminum, and M3 comprises vanadium, chromium, iron, zirconium, rhenium, boron, germanium, ruthenium, tin, titanium, niobium, molybdenum, or platinum; and
$0.9 \le a \le 1.1$, $0.7 < b < 1.0$, $0 < c < 0.3$, $0 < d < 0.3$, $0 \le e < 0.1$, and $b+c+d+e=1$.

$$Li_aNi_bCo_cMn_dM3'_eO_2 \quad \text{Formula 3}$$

wherein, in Formula 3,
M3' comprises vanadium, chromium, iron, zirconium, rhenium, aluminum, boron, germanium, ruthenium, tin, titanium, niobium, molybdenum, or platinum,
$0.9 \le a \le 1.1$, $0.7 < b < 1.0$, $0 < c < 0.3$, $0 < d < 0.3$, $0 \le e < 0.1$, and $b+c+d+e=1$,-
wherein a sum of an amount of the second lithium transition metal oxide and an amount of the first composition is about 10 weight percent or less, based on a total weight of the composite cathode active material.

* * * * *